United States Patent
Brombach

(10) Patent No.: US 11,898,540 B2
(45) Date of Patent: Feb. 13, 2024

(54) METHOD FOR FEEDING ELECTRICAL POWER INTO AN ELECTRICAL SUPPLY NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/565,283

(22) Filed: Dec. 29, 2021

(65) Prior Publication Data

US 2022/0205426 A1 Jun. 30, 2022

(30) Foreign Application Priority Data

Dec. 30, 2020 (EP) .................................... 20217862

(51) Int. Cl.
*F03D 7/00* (2006.01)
*F03D 7/04* (2006.01)

(52) U.S. Cl.
CPC .......... *F03D 7/048* (2013.01); *H02J 2300/28* (2020.01)

(58) Field of Classification Search
CPC .......... H02J 3/381; H02J 3/46; H02J 2300/24; H02J 2300/28; F03D 7/048; F03D 7/0284; F03D 9/257
See application file for complete search history.

(56) References Cited

U.S. PATENT DOCUMENTS

| | | | |
|---|---|---|---|
| 11,067,059 B2* | 7/2021 | Brombach | F03D 7/048 |
| 2008/0042442 A1 | 2/2008 | Richter et al. | |
| 2008/0150283 A1 | 6/2008 | Rivas et al. | |
| 2015/0249416 A1* | 9/2015 | Barker | H02P 9/10 |
| | | | 290/44 |
| 2015/0280629 A1 | 10/2015 | Diedrichs et al. | |
| 2019/0211803 A1 | 7/2019 | Brombach et al. | |
| 2020/0116127 A1 | 4/2020 | Brombach | |
| 2020/0119560 A1 | 4/2020 | Brombach | |

(Continued)

FOREIGN PATENT DOCUMENTS

| | | |
|---|---|---|
| DE | 10 2016 115 431 A1 | 2/2018 |
| DE | 10 2017 112 944 A1 | 12/2018 |
| DE | 10 2017 113 006 A1 | 12/2018 |

(Continued)

*Primary Examiner* — Julio C. Gonzalez
(74) *Attorney, Agent, or Firm* — Seed IP Law Group LLP

(57) ABSTRACT

Provided is a method for feeding electrical power into an electrical supply network using a converter-controlled infeed apparatus. The apparatus feeds into a local network section of the electrical supply network at a network connection point. The network has further infeed apparatuses and consumers for consuming electrical power. The local section has a ratio of power able to be fed in using converters to a total power able to be fed in by all infeed apparatuses of at least 50%. A controller controls the infeed of the electrical power depending on a network state of the network. The controller has control behavior that depends on a network characteristic of the local section. The network characteristic is dependent on at least one property of the local section and at least one property of a further network section of the network or a determination that no further network section is present.

14 Claims, 8 Drawing Sheets

(56) References Cited

U.S. PATENT DOCUMENTS

2021/0044115 A1   2/2021   Quitmann et al.
2021/0159704 A1   5/2021   Schwanka Trevisan et al.

FOREIGN PATENT DOCUMENTS

| DE | 10 2018 102 220 A1 | 8/2019 | |
|---|---|---|---|
| EP | 1 892 412 A1 | 2/2008 | |
| EP | 2 899 828 A1 | 7/2015 | |
| WO | 2014/009226 A1 | 1/2014 | |
| WO | WO-2018228901 A1 * | 12/2018 | ............... F03D 7/00 |
| WO | 2020/007995 A1 | 1/2020 | |

* cited by examiner

METHOD FOR FEEDING ELECTRICAL POWER INTO AN ELECTRICAL SUPPLY NETWORK

BACKGROUND

Technical Field

The present invention relates to a method for feeding electrical power into an electrical supply network by means of a converter-controlled infeed apparatus. The present invention also relates to a wind energy system comprising at least one wind power installation for feeding electrical power into an electrical supply network.

Description of the Related Art

Nowadays, at any rate in some regions, electrical supply networks are increasingly being influenced by converter-controlled infeed apparatuses. The proportion of conventional infeed apparatuses, in particular large power plants, which feed into the electrical supply network by means of directly coupled synchronous generators, is declining.

Against this background, particularly for the converter-controlled infeed apparatuses, strategies adapted to this situation have been developed, including FRT strategies concerning the ride through of a network fault (FRT=Fault Ride Through). Present-day FRT strategies have often been developed for networks in which a minimum number of synchronous machines are present both locally (electrically near) and globally and in which the conditions essentially do not change. Nowadays, in many network sections and even in some networks, i.e., electrical supply networks in their entirety, situations occur in which the assumption mentioned above no longer applies.

Correspondingly developed strategies may therefore potentially no longer be suitable and possibly lead to problems.

In the priority application with respect to the present application, the European Patent Office searched the following prior art: DE 10 2016 115 431 A1; DE 10 2017 113 006 A1; DE 10 2017 112 944 A1; EP 1 892 412 A1; US 2008/150283 A1; DE 10 2018 102 220 A1; WO 2020/007995 A1; EP 2 899 828 A1 and WO 2014/009226 A1.

BRIEF SUMMARY

One or more embodiments are directed to providing infeed strategies that are adapted as suitably as possible to the electrical supply network or the relevant network section of the electrical supply network.

A method is proposed. Provision is made of a method for feeding electrical power into an electrical supply network by means of a converter-controlled infeed apparatus, which feeds electrical power into the electrical supply network by means of at least one converter. The converter-controlled infeed apparatus can be embodied in particular as a wind power installation or as a wind farm comprising a plurality of wind power installations. Such wind power installations generate electrical power by means of a generator and the electrical power thus generated is then fed into the electrical supply network by means of at least one converter. For this purpose, the at least one converter can control magnitude and phase of a current fed in. A plurality of converters, also including inverters, can often be connected in parallel on the output side. That is conceivable in particular for a wind farm, but a single wind power installation can also use a plurality of converters and/or inverters connected in parallel. Instead of a wind power installation or a wind farm, another conceivable converter-controlled infeed apparatus is a photovoltaic installation, to mention a further example.

Provision is furthermore made for the converter-controlled infeed apparatus to feed into a local network section of the electrical supply network at a network connection point. The electrical supply network can thus be subdivided into a plurality of network sections, and one of these network sections is assigned to the converter-controlled infeed apparatus and thus forms a local network section for the converter-controlled infeed apparatus. The converter-controlled infeed apparatus feeds into said local network section.

Provision is furthermore made for the electrical supply network, thus having the converter-controlled infeed apparatus, also to have further infeed apparatuses, each of which is prepared for feeding in electrical power. The electrical power fed into the electrical supply network by all these infeed apparatuses is referred to here as infeed power.

Furthermore, provision is made for the electrical supply network to have consumers for consuming electrical power. This electrical power provided for consumption, which therefore is then also consumed, is referred to as consumption power. Such consumers may be for example factories, or electric charging stations for charging electric vehicles, or a village or town or city may also be regarded as an electrical consumer, even if it is composed of many individual consumers. By way of example, a foundry may also be a consumer, namely an industrial consumer.

It is then furthermore proposed that the local network section has a high converter pervasion. A converter pervasion specifies a ratio of power able to be fed in by means of converters to total power able to be fed in by all infeed apparatuses. That relates of course to the network section under consideration, i.e., denotes the ratio of power able to be fed in by means of converters in the network section under consideration to total power able to be fed into the network section under consideration by all infeed apparatuses of said network section. In this respect, here the possible infeed power is taken into account in each case. The power able to be fed in by means of converters is thus the power that could be fed in by the converter-controlled infeed apparatus and further converter-controlled infeed apparatuses in the network section under consideration if they feed in with rated power in each case. Whether they are currently feeding in rated power or less is not relevant to this variable of converter pervasion. However, only converter-controlled infeed apparatuses which are not disconnected from the electrical supply network are considered. The converter pervasion of a network section can thus also be referred to as the ratio of the sum of the rated powers of all converter-controlled infeed apparatuses of this network section to the sum of the rated powers of all infeed apparatuses of this network section, only infeed apparatuses which are not disconnected from the network being considered.

Here a high converter pervasion is taken as a basis for the local network section and a high converter pervasion is defined by a value of at least 50%. At least half of the total rated power of this local network section that is able to be fed in must therefore be assigned to converter-controlled infeed apparatuses. It has been recognized that such a local network section which has a high converter pervasion should be given particular consideration, which will also be explained in detail below.

It is then furthermore proposed that the electrical power is fed in by means of an infeed control, which controls the infeed of the electrical power depending on a network state of the electrical supply network. In particular, the network voltage, the network frequency and possible network faults, including whether network faults are actually present, are conceivable as network state. The infeed control takes account of such network states when controlling the infeed.

In this case, the infeed control has a control behavior with an input/output behavior. Such an input/output behavior can be characterized by a linear or nonlinear transfer function. In particular, such an infeed control can have a gain. By way of example, the infeed control can have a power change to be set for the power to be fed in depending on a detected voltage deviation of the network voltage from a reference value. In this example, the voltage deviation is the input variable of the infeed control and the resulting power change is the output variable of the infeed control. The input/output behavior can then be characterized by a step response, for example. The step response denotes the temporal profile of the output variable as a response to a sudden change in the input variable. However, the infeed control can also include further functions, such as the switchover of a functionality, such as the switchover from a current-impressing infeed to a voltage-impressing infeed.

The local network section can be characterized by a network characteristic, and the network characteristic is dependent on at least one property of the local network section and in addition on at least one property of a further network section of the electrical supply network, said further network section being connected to the local network section, or the network characteristic is dependent on at least one property of the local network section and in addition on the fact that no further network section is present. In this second case, the local network section forms an island network.

It is thus proposed to characterize the local network section and in so doing to take account of its coupling to possible neighboring network sections, to which specifically it is connected, or at least to a further neighboring network section. It has been recognized in particular that for example a converter pervasion of the local network section, which can form a property of the local network section, can lead to different network characteristics of the local network section, depending on what kind of neighboring network section is present. The coupling between two neighboring network sections is often very strong and that can mean in particular that the neighboring network section can possibly support the local network section. However, it can also mean that the local network section must concomitantly take account of possible problems or other modes of behavior of the neighboring network section. Details in this respect will be explained even further below.

It is then proposed that the control behavior is set depending on the network characteristic of the local network section. Consequently, the control behavior thus takes account of at least one property of the local network section and at least one property of the further network section connected to the local network section. In this case, however, these properties are not considered individually, rather the extent to which they determine the local network section is considered. In this regard, it has been recognized for example that a local network section which has a high converter pervasion but is embedded into network sections dominated by large power plants behaves differently and is therefore to be controlled differently than if it were embedded into network sections that for their part have a high converter pervasion.

In accordance with one aspect, for a characterization of the local network section it is possible to differentiate between network characteristics from the following list.

The local network section can be characterized as an island network. It is characterized as an island network if the local network section corresponds to the electrical supply network, the electrical supply network forms a self-contained network, and the sum of the consumption powers of all consumers connected to the supply network does not exceed a value of 5 GW. The converter pervasion can be up to 100%. These criteria thus characterize the local network section if it can be characterized as an island network.

In this case, such a characterization also takes account of the fact that the network section and thus the island network overall are comparatively small with a maximum consumption power of 5 GW. Power deviations can thus have a large effect in such an island network. Moreover, such an island network can also readily be operated by converter-controlled infeed apparatuses. The island network under consideration here thus has a converter pervasion of 50 to 100%. In the case of a converter pervasion of 100%, said island network is therefore completely fed and thus operated by converter-controlled infeed apparatuses.

The electrical supply network on the Faroe Islands is one example of such an island network, i.e., of a local network section that can be characterized as an island network. There the proportion of electrical power fed in compared with the total electrical power fed in can be up to 90%. The electrical supply network on the Faroe Islands is therefore an island network geographically as well, since the Faroe Islands are an island group geographically as well, but an island network need not necessarily exist on an island or island group.

A further example is the electrical supply network on the Caribbean island Sint Eustatius, which can achieve a proportion provided by renewable energy sources in the power infeed of 100%.

Properties to be emphasized of such island networks, whether they are then isolated on a geographical island or for other reasons, include the property that a self-contained small network is present. It often has busbar power plants, in which electrical power for infeed is concentrated on a busbar. A distributed infeed is also conceivable. For the upper limit of the sum of the consumption powers, 5 GW was specified above, but usually the maximum network load is normally not more than 1 GW.

A further property is that the frequency is soft. It may thus be subject to slight fluctuations that need not necessarily be attributed to an impermissible power imbalance. Rather, the centrifugal mass in these networks is small in relation to the network disturbances and relatively large frequency fluctuations are accepted in the operational control.

Normally such a network is also characterized by the fact that voltage angle differences are small. The phase angle of the voltage thus differs little in the entire network. Here differences of a maximum of 60°, in particular a maximum of 45°, are designated as small voltage angle differences.

Such an island network also does not comprise a traditional transmission network. Superordinate network levels may be manifested, but are correspondingly small. In particular, no extra-high voltage level is found, and often no high-voltage level either.

A further property may consist in energy supplier and network operator not being separated. Therefore, corresponding control and regulating units can also be technically combined, in particular accommodated at one location and/or in one building or other housing. In particular, control units for controlling the power infeed and for controlling the power transmission and/or for controlling consumers are well coordinated with one another.

A further property is that network oscillations cannot occur, or cannot occur to an appreciable extent. That is also due in particular to the small size of such an island network. The proportion of power fed in by renewable energy sources can fluctuate between 0% and 100%.

In this respect, it has been recognized in particular that the following challenges or requirements may arise. Very small centrifugal masses may be present, possibly no centrifugal masses at all.

A further property of an island network is that the direct coupling between active power and frequency and also reactive power and voltage is weaker, or else the power consumption may be more greatly dependent on the voltage and the reactive power demand may be more greatly dependent on the frequency. The frequency is thus determined by power imbalances to a lesser extent, but rather also by the reactive power balance. The network voltage is determined not only by the reactive power equilibrium, but also by the active power balance, and vice versa. A further property of such island networks is a strong self-regulating effect. That means in particular that a fluctuating frequency leads to a fluctuating consumption power. A change in the voltage can likewise lead to a changed drawing of power.

The local network section can also be characterized as a section with high converter pervasion connected to a strong network. This characterization is provided if the local network section is connected to a superordinate network section, the sum of the consumption powers of all consumers connected to the electrical supply network exceeds a value of 5 GW, the superordinate network section is part of the electrical supply network, and the superordinate network section has a high centrifugal mass index, wherein a centrifugal mass index of a network section specifies a ratio between electrical power able to be fed into the network section by directly coupled synchronous generators to total power able to be fed into the network section, and a high centrifugal mass index is defined by a value that lies above a predefinable centrifugal mass reference index.

A superordinate network section is in particular one which has a higher voltage level vis-à-vis the local network section. By way of example, the local network section can have a medium voltage, in particular in the range of 1 kilovolt (kV) to 50 kV, while the superordinate network section can have a high voltage, which can be 110 kV, for example. A superordinate network section is in particular one which connects a plurality of network sections, wherein these network sections connected by said superordinate network section are then correspondingly subordinate network sections vis-à-vis said superordinate network section. In this regard, the superordinate network section can connect the local network section to a further network section. Additionally or alternatively, a superordinate network section can be one which has priority over the local network section in the case of a network recovery. The superordinate network section can thus be above the local network section in a hierarchy. A superordinate network section can additionally or alternatively be characterized by the fact that the power able to be fed in from all its infeed apparatuses is greater than the power able to be fed into from all infeed apparatuses of the local network section.

For such a superordinate network section, a high centrifugal mass index is thus provided for this characterization. The centrifugal mass index can be for example at least 50%, in particular at least 70%, more preferably at least 80%. In this case, therefore, conventional infeed apparatuses are dominant in this superordinate network section and, as a result, the superordinate network section forms a strong network. A local network section with high converter pervasion is then present, therefore, which is assigned and subordinate to a strong network section. That can be taken into account in the control, in particular such that a stable behavior of this superordinate network section can be relied on.

In particular, provision is made for the local network section to be characterized as a section with high converter pervasion connected to a strong network if the total power able to be fed into the superordinate network section has at least three times, in particular at least four times, the value of the total power able to be fed into the local network section.

What may be regarded as one example of a local network section which can be characterized as a section with high converter pervasion connected to a strong network is the 50 hertz control zone in Germany. Here the proportion of power fed in by renewable energy sources can at times even exceed 100%. By way of example, values of 160% have already occurred. That means that in that case power from renewable energy sources is output, i.e., exported, from this local network section to a superordinate network section. The superordinate network section may be part of the transmission network of the European interconnected grid. Renewable energy sources can thus generate more than 100% power and hence export power into the rest of the strong network.

The superordinate network section can also be a meshed network, which specifically is connected to many further local and other network sections, as is the case for the transmission network of the European interconnected grid.

Properties of such a local network section which can be characterized as a section with high converter pervasion connected to a strong network are, therefore, that a high proportion of centrifugal masses is present. That may also be referred to as globally high centrifugal mass that is present. Such a high centrifugal mass or such a high centrifugal mass proportion can ensure a stable network frequency, in particular. At the same time, this high centrifugal mass proportion has the effect that a frequency change can be assigned to a distinct power imbalance.

A further property of such a local network section is that high power transfers can occur. That includes the already discussed power transmission from renewable energy sources in the local network section to the superordinate network section.

An at times high overfeeding of individual regions within the local network section can also occur. That denotes a situation in which more electrical power is fed in than is consumed. Such a high overfeeding can then lead to a power transfer. However, consideration is also given to counteracting an overfeeding by corresponding infeed reduction.

A further property is that a proportion of power fed in by renewable energy sources can fluctuate greatly, in particular in the range of between 10% and 200%, in particular between 10% and 160%. That refers to the power fed in by renewable energy sources with respect to the total power consumed in the network section. Despite the aforementioned possible low value of 10% for a proportion of power fed in by renewable energy sources, relative to the consumed power, the converter pervasion nevertheless remains high since this relates to the power able to be fed in, i.e., to the amount of rated power with which converter-controlled infeed apparatuses are connected, in comparison with the total connected rated power.

It has also been recognized here in particular that particular challenges and requirements may arise for such a local network section. It has been recognized here in particular that very high power surpluses can be present in the case of a network separation. This can necessitate in particular a rapid power reduction in order to catch an overfed zone in the event of network separation. In this case, the overfed zone can also form a partial section of the local network section. As long as the local network section is connected to the superordinate network section, no problem is posed by the power export and thus also the situation of an overfed zone, provided that this surplus does not become too large. It may even be desired in order also to supply other parts of the electrical supply network with renewable energy. If a network separation arises, however, the power fed in has to be reduced correspondingly rapidly in the case of an overfeeding and/or in the case of an export. The infeed controller can take that into account.

Alternatively or additionally, for the local network section which can be characterized as a section with high converter pervasion connected to a strong network, provision can be made for the superordinate network section to be characterized by a large power exchange capacity with respect to the local network section instead of being characterized by the centrifugal mass index, or in addition thereto. Accordingly, the superordinate network section has a power exchange capacity with respect to the local network section, wherein the power exchange capacity denotes a ratio between maximum power exchangeable between the superordinate network section and the local network section in relation to power able to be fed in by all infeed apparatuses of the local network section, and is at least 50%. The superordinate network section can thus take up at least 50% of the power able to be generated by the local network section itself, or provide it to the local network section. Preferably, the power exchange capacity has at least the value of 100%. In this case, the superordinate network section is so strong that it could completely support the local network section. That concerns both the supply of the local network section and the acceptance of the power generated in the local network section.

The power exchange capacity can be ensured in particular by corresponding coupling locations between the local network section and the superordinate network section, these two network sections specifically being connected to one another via said coupling locations. In order to achieve this high power exchange capacity, provision can be made of a plurality of coupling locations between the two network sections for this purpose.

However, the power exchange capacity also includes the fact that the superordinate network section can generate or accept enough power, and can at least transmit it further. It is therefore also necessary to ensure that the power transmitted between the two network sections can also be taken up or provided by the superordinate network section.

The local network section can also be characterized as a section with locally high converter pervasion connected to a normal network. Such a characterization is present if the converter-controlled infeed apparatuses of the local network section are connected to the local network section with an average short circuit ratio having a value of a maximum of 4, in particular a maximum of 2, if moreover the local network section is connected to a superordinate network section, the sum of the consumption powers of all consumers connected to the electrical supply network exceeds a value of 5 gigawatt (GW), the superordinate network section is part of the electrical supply network, and the superordinate network section has a medium to high centrifugal mass index that lies in the range of 20% to 100%.

A short circuit ratio, which in German linguistic usage, too, among experts is referred to as "Short circuit ratio" and is abbreviated to "SCR," is the ratio of the short circuit power to the connection power. The short circuit power denotes that power which can be provided by the relevant supply network, or here the network section under consideration, at the network connection point to which the relevant infeed apparatus is connected, if a short circuit occurs there. The connection power denotes the connection power of the connected infeed apparatus, namely in particular the rated power thereof.

An average short circuit ratio is the average value of all short circuit ratios of the infeed apparatuses of the local network section. The average value can be formed by the sum of all short circuit powers being expressed as a ratio with respect to the sum of all connection powers. Alternatively, it is possible to form an average value over all short circuit ratios, these being weighted proportionally to the rated power of the respective generator.

Moreover, the sum of all connection powers can be expressed as a ratio with respect to a short circuit power of an individual transmission path if a meshed network structure is not present.

A value of a maximum of 4, in particular a maximum of 2, thus describes a small short circuit ratio. Large short circuit ratios have a value of approximately 10, at least 8 or at least 6. A short circuit ratio having such a low value of a maximum of 4 or less thus characterizes a weak connection. Such a weak connection can be caused in particular by a long connection line or connecting line to the network connection point. Such small short circuit ratios therefore occur particularly in the case of infeed apparatuses arranged in a very decentralized manner. Particularly wind power installations or wind farms and photovoltaic installations may be arranged in a very decentralized manner, i.e., far away from consumers. Sometimes there may be up to one hundred km or hundreds of km between such a decentralized infeed apparatus and a consumer of significant size, or a network centroid.

Therefore, this local network section is also referred to as a section with locally high converter pervasion because the converter pervasion itself occurs within this local network section at these decentralized positions. The converter-controlled infeed apparatuses are thus concentrated at some local regions.

The superordinate network section, with a medium to high centrifugal mass index, basically has a strong or medium-strength network section, which however, on account of the particular topology of the local network section, can support the latter only to a limited extent. At any rate the support given cannot be as good as that in the case of the local network section which can be characterized as a section with high converter pervasion connected to a strong network. For this reason, too, the local network section can be characterized such that it is connected to a normal network. At any rate it is not outstandingly strong. It has been recognized here that at least in comparison with the local network section the superordinate network should be rigid, i.e., should have a higher centrifugal mass index or should have more directly coupled centrifugal mass, in order to substantiate this characterization.

Examples of such local network sections are known for example from Texas and Canada, but also from South Australia. In these places there are large areas which are only sparsely populated and in which many renewable energy sources have been set up. Here a proportion of power fed in by renewable energy sources relative to consumed power can far exceed 100%, and reach up to 300% in Texas and Canada.

Such a local network section which can be characterized as a section with locally high converter pervasion connected to a weak network can have the following properties.

One property is that renewable energy generation takes place in remote regions that are linked to a load center via long lines. A short circuit ratio at infeed points of the renewable energy sources is therefore very small.

Such a local network section also has little centrifugal mass and this property is associated with the property of the local network section that the latter can be referred to as a weak network.

The following challenges and requirements have been recognized. One challenge, therefore, is that of feeding into a weak network. By virtue of the fact that a very high converter pervasion is present, it can be difficult to maintain a phase angle stability or to comply with it with high accuracy. That concerns an interaction between current control and phase angle of the voltage. How stable the phase angle can be kept here is referred to as the phase angle stability. If the centrifugal mass locally is zero or very small, normally an attempt has to be made by way of control engineering to keep the phase angle stable, or the latter has to be specifically controlled. The effect that the phase angle has to be kept stable in a targeted manner occurs to a lesser extent if, e.g., a local power plant or a local phase shifter is present. A virtual synchronous machine could also have a stabilizing effect here.

For a local network section which can be characterized as a section with locally high converter pervasion connected to a normal network, it is proposed in particular to select and/or to set a voltage combination control for a wind farm.

A voltage combination control describes a control in which for a wind farm for ride through of a fault or a disturbance, provision is made of a voltage-dependent reactive power control for each wind power installation of the wind farm, in particular with different characteristic curves for the wind power installations, wherein before and after the disturbance instead of the voltage-dependent reactive power control for each wind power installation, use is made of a reactive power control which is controlled centrally by a farm controller of the wind farm and in which the farm controller predefines a reactive power setpoint value for each wind power installation of the wind farm.

It has also been recognized here that such a network can have a high vertical network load, which will be described in even greater detail further below, and that the vertical network load can additionally mean a weakening for the locally high converter pervasion. As a result of the vertical network load, the short circuit ratio may decrease further, or at least remain small. Therefore, here a voltage combination control is proposed such as is also proposed for a situation of a high local network load.

For the voltage-dependent reactive power control for each wind power installation, parameters are preferably set depending on the vertical network load, in particular at least a dead band and/or a gain factor, which can also be referred to as k-factor. Such a setting can also or alternatively be effected depending on the average short circuit ratio.

A and/or the described voltage-dependent reactive power control for each wind power installation for ride through of a fault or a disturbance by means of a characteristic curve, namely a voltage-reactive power characteristic curve, can also be referred to as FRT control, with FRT k-factors and an FRT dead band. Selection and setting of an FRT control can thus be effected depending on the average short circuit ratio.

The local section can also be characterized as a section with high converter pervasion connected to a network with high converter pervasion. In this case, the local network section is connected to a superordinate network section, the sum of the consumption power of all consumers connected to the electrical supply network exceeds a value of 5 GW, the superordinate network section is part of the electrical supply network, and the superordinate network section has a low centrifugal mass index, wherein a low centrifugal mass index is defined by a value that lies below the predefinable centrifugal mass reference index or lies below a second centrifugal mass reference value. The second centrifugal mass reference value lies in the range of 20 to 40%, in particular.

Here, therefore, the local network section having a high converter pervasion is connected to a superordinate network section itself having a high converter proportion. It thus has centrifugal masses to a small extent.

The electrical supply network of Ireland can constitute one example of such an electrical supply network. There the electrical supply network in its entirety, and thus also the superordinate network section, is characterized by a high converter pervasion and individual network sections and thus also at least one local network section likewise have a high converter pervasion.

The following properties have been recognized for such networks.

There may be large phase angle differences in the electrical supply network. This denotes deviations between the phase angles at different locations in the electrical supply network. A transmission network level is present via which a large amount of power is transmitted. In this case, these power transmissions can fluctuate, both in terms of direction and in terms of size.

Little centrifugal mass is present and, therefore, the phase angle can also be kept stable less well.

Likewise, little short circuit power is available, such that this has to be taken into account at least in the case of possible network faults, the ride through of which specifically can be worse as a result. In addition, few empirical values have been available hitherto for such networks and a control should also adapt to that.

One property, moreover, is that a proportion provided by renewable energies in the power infeed can fluctuate between 10% and 70%. The proportion of the power fed in by renewable energy sources with respect to the total power fed in can thus fluctuate between 10% and 70%.

In particular, the following challenges and requirements have been recognized. In particular, it has been recognized that special features of such networks should be taken into account by correspondingly flexible controls. In particular, it is possible to use adaptive controllers in such controls and they can compensate for the still sparse empirical resources.

It has been recognized, inter alia, that sometimes high proportions of fed-in power provided by renewable generators should be taken into account. The properties mentioned above can be addressed by corresponding control. One possibility is to configure a control or the type of the infeed such that they operate as a virtual synchronous machine. The deficiency of conventional synchronous machines embodied as synchronous generators coupled directly to the electrical supply network can be at least partly compensated for by a corresponding emulation, namely in the form of virtual synchronous machines.

The local network section can also be characterized as a section with indefinite behaviors if none of the abovementioned characterizations is applicable. In such a case, control strategies used hitherto can be used, or properties and modes of behavior can be detected by preliminary examinations or measurements and the infeed control can be adapted thereto.

With respect to the various possible characterizations it is then proposed to select and/or to set the control behavior depending on the network characteristics explained above. An adapted control strategy is possible as a result.

It has also been recognized that in different electrical supply networks, different requirements made of the infeed apparatuses can occur depending on a present converter pervasion and/or depending on a renewable capacity factor. That is addressed by the evaluation or setting of the control behavior. In particular, it is conceivable here that different fault strategies can also arise. Likewise, a local export or import can be crucial and that, too, can be taken into account with the control behavior. What is likewise relevant is an average local operating point of the renewable energy sources, i.e., of the infeed apparatuses that feed in from renewable energy sources.

The differences recognized can be taken into account by the control behavior and the infeed control can thus be selected or set accordingly. The infeed of the electrical power is thus controlled by means of a converter-controlled infeed apparatus. The infeed control thus controls the converter-controlled infeed apparatus. The infeed control can thus correspondingly control in particular a wind energy system, i.e., a wind power installation or a wind farm.

However, it is also conceivable that other infeed apparatuses are additionally controlled. Particularly if the converter-controlled infeed apparatus can only be controlled inadequately, and other infeed apparatuses have to take over part of its control task, or this is at least proposed, the proposed method can concomitantly comprise such a control of other infeed apparatuses.

In particular, it is also proposed to control not just one converter-controlled infeed apparatus, but also a plurality of converter-controlled infeed apparatuses of the local network section, in particular to control them in an identical manner. As a result, the advantages and properties of the proposed control can have a particularly pronounced effect if they are implemented in parallel by many converter-controlled infeed apparatuses. Preferably, the control of a plurality of converter-controlled infeed apparatuses is coordinated centrally. In this respect, an infeed control can include and/or coordinate a plurality of distributed controls or controllers.

In accordance with one aspect, the control behavior in addition is selected or set depending on a network state of the electrical supply network. Additionally or alternatively, it is selected or set depending on a present converter infeed proportion. In this case, a converter infeed proportion specifies a ratio of power fed in by means of converters of the local network section to total power fed in by all infeed apparatuses of the local network section.

It is thus proposed additionally to select or set the control behavior depending on a present infeed situation. A network state can denote here in particular how much power is fed in and drawn and by what type of infeed apparatuses the power is fed in under what division.

The present converter infeed proportion of the local network section can thus be a network state of the electrical supply network. By comparison with the converter pervasion, which takes account only of the ratio between rated powers of connected infeed apparatuses, the converter infeed proportion concerns the ratio of the powers actually fed in. It is thus proposed to take both into account. Specifically, it is intended to be taken into account when setting the control behavior. In principle, setting the control behavior always also includes selecting the control behavior, not just for this aspect. Finally, setting a control behavior can also be carried out by selection between control behaviors with different settings. However, it is also possible, in principle, to select different control behaviors which, however, can also be attained by corresponding settings. By way of example, it is possible to select between a linear and a nonlinear control behavior.

In particular, it is proposed that the converter pervasion, which in this respect forms a static converter proportion, defines a short circuit current. The latter can thus be adapted by a change in the static relations and/or an activation or limitation if said current is too small or too large. This static proportion, i.e., the converter pervasion, can also influence the size of a potential gradient area in the shape of a funnel in the case of a fault, this describing the extent to which a voltage, in particular the network voltage, can fluctuate or dip.

The dynamic converter proportion, i.e., the converter infeed proportion, can influence an active power control during a dynamic network backup. In this respect, a dynamic network backup is a frequency-dependent active power infeed, i.e., the change in the active power infeed depending on deviations of the network frequency from a rated network frequency or other reference value of the frequency. It is proposed here, in particular, that in the case of a large converter infeed proportion in the case of such a dynamic network backup, as little active power as possible is intended to be lost.

For this purpose, an active power priority can be proposed, which can also be referred to as active power prioritization, in the case of which the infeed of active power is granted a priority over the infeed of reactive power if both infeeds cannot be carried out simultaneously to a full level on account of a current limitation. That avoids an active power loss that could otherwise arise if, without active power prioritization, the infeed of a reactive power could limit the infeed of an active power or reduce it to 0. That is thus proposed in particular for a high dynamic converter proportion, i.e., a high converter infeed proportion. This can be proposed all the more particularly if a large potential gradient area in the shape of a funnel is expected or voltage dips would concern a large area and thus many renewable infeed apparatuses.

In particular, consideration is given to the following measures for setting or selecting the control behavior, which also take account of a possible characterization of the local network section. Moreover, it is generally proposed to take account of at least three network characteristics of the local network section. In particular, it is proposed to take account of whether the local network section is characterized as a section with high converter pervasion connected to a strong network, as a section with locally high converter pervasion connected to a weak network, or as a section with high converter pervasion connected to a network with high converter pervasion. Preferably, it is proposed that a check as to which network characteristic is present is repeated after a checking time has elapsed, which can be in particular in the range of 1 month to 1 year.

If the local network section can be characterized as an island network, the following control behaviors are proposed.

An active power prioritization is proposed, which can synonymously also be referred to as active power priority.

For this purpose, preferably, the provision of an active current upper limit is supplementarily proposed. Preferably, the active current upper limit is set depending on present active power proportions, in particular depending on the converter infeed proportion.

Preferably, it is additionally proposed to ensure a maximum minimum reactive current that is dimensioned in particular with a magnitude such that adjacent electrical fuses can be tripped. Network lines can be protected by fuses which trip in the event of excessively high current and then open. Such a fuse, which in this respect forms a network disconnecting switch, can be tripped as a result of the infeed of a correspondingly high reactive current. The network topology can be influenced in a targeted manner as a result.

Preferably, a low k-factor is proposed. Such a k-factor describes a relationship between a voltage deviation and a reactive power proportion to be fed in. The voltage deviation denotes a deviation of the network voltage from a reference value, in particular from the rated network voltage. This deviation can be normalized to the rated network voltage as a normalized deviation. The reactive power proportion denotes a reactive power which is additionally to be fed in depending on the voltage deviation. That may also be the only reactive power that is to be fed in. The reactive power proportion can be taken into account as a normalized reactive power proportion normalized to the rated power of the corresponding infeed apparatus. The k-factor is then the quotient of normalized reactive power proportion and normalized voltage deviation. A small k-factor has a value of less than 4, in particular less than 3, and preferably less than 2.

In the case of a characterization of the local network section as an island network, in addition, at least in accordance with one aspect, a negative phase sequence system infeed is proposed. An asymmetrical three-phase network can be described by the method of symmetrical components. A positive phase sequence system component and a negative phase sequence system component then arise, which for simplification is also referred to as positive phase sequence system or negative phase sequence system, and the positive phase sequence system component is the one which describes the symmetrical and hopefully predominant proportion of the three-phase system.

Symmetrical infeed is usually effected in order thereby to impart to the electrical supply network as far as possible a symmetrical behavior. The asymmetries can be taken into account by way of the negative phase sequence system component. It is nevertheless unusual to feed in a negative phase sequence system component. That is precisely what is proposed here, however, namely to feed in an asymmetrical portion in the case of an island network, namely by feeding in a negative phase sequence system component, in particular by way of a negative phase sequence system current.

If the local network section is characterized as a section with high converter pervasion connected to a strong network, the following control behavior is proposed. A reactive power prioritization or reactive power priority is proposed; accordingly, the reactive power infeed is given preference if an envisaged active power infeed together with an envisaged reactive power infeed would reach a current limit. This is based on the concept, in particular, that in the case of such a local network section, the main emphasis is on a voltage stabilization by means of the reactive power infeed because the superordinate network section can provide enough active power as necessary and the reactive current is required in order to ensure the selectivity of the network protection, in particular in meshed network structures.

Therefore, a high k-factor is preferably provided, too, which is in particular greater than 4, preferably greater than 6, and in particular greater than 8.

Preferably, for such a local network section, it is proposed to provide a reactive current upper limit if a high converter infeed proportion of the local network section is present. A high converter infeed proportion is present particularly if its value is above 60%. It has been recognized here in particular that with a high dynamic converter proportion, that is to say with a high converter infeed proportion, a voltage backup by reactive power infeed, in the case of reactive power prioritization, can lead to a decrease in the active power fed in, which can be significant in the case of a high converter infeed proportion and possibly even impairs the stability of the entire network. A reactive current upper limit is therefore proposed in order to prevent that.

If the converter infeed proportion is low, however, while the converter pervasion is high, however, the converter-controlled infeed apparatuses of the local network section can make a high contribution to the voltage backup by reactive power infeed, without this having the consequence of a great decrease in the active power infeed. It has been recognized here in particular that such converter-controlled infeed apparatuses, in particular specifically renewable energy sources, can supply a high reactive current or a high reactive power, even if presently they can supply only little active power, because, e.g., the wind is low in the case of wind power installations or the insolation is low in the case of photovoltaic installations.

If the local network section can be characterized as a section with locally high converter pervasion connected to a weak network, the following control behavior is proposed. It is proposed to use a zero power mode or a continuous voltage control. A zero power mode is a method in which an infeed apparatus feeds in reactive power without feeding in active power. That is given consideration particularly if no active power at all is available for infeed. The zero power mode can therefore also be referred to synonymously as reactive power infeed without active power infeed.

What is also a matter of importance here, inter alia, this therefore being proposed, is that converter-controlled infeed apparatuses, i.e., in particular renewable infeed apparatuses, which can also be referred to synonymously as renewable energy sources, are not disconnected from the electrical supply network, i.e., are not disconnected from the local network section, even though no active power is available for infeed. In principle it is better to disconnect installations from the network if they cannot feed in, but here this special mode is proposed in order to take account of the special features of said local network section. Specifically, said local network section is distinguished in particular by the spatially widely distributed renewable infeed apparatuses, this being characterized by long transmission lines. Corresponding voltage drops are conceivable here, which are thus especially counteracted by control.

Preferably, the size of the superordinate network is taken into account here in particular. The size here is considered to be the power able to be fed in in each case, namely in each case from all infeed apparatuses connected in the respective network section. If the superordinate network, which can also denote the superordinate network section, is less than five times the size of the local network section, then it is proposed, in the case of a high converter infeed proportion, to reduce the active power fed in and/or to introduce an apparent current limit that prevents a maximum active power infeed. This takes account of the fact that a very large backup effect is then not to be expected from the superordinate network section and must therefore be ensured by the local network section at least partly itself. As a result of the reduction of the active power fed in, it is possible as a result to create a control potential and/or the effect is achieved that the local network section or the infeed apparatuses is or are not operated at power limits. By this means, too, it is possible to achieve a stabilization or to avoid a destabilization.

Additionally or alternatively, it is proposed to choose a small k-factor. Here, too, a small k-factor is one which is less than 4, preferably less than 3, in particular less than 2. A small gain factor makes it possible to prevent the generation of an excessively high reactive current which can adversely affect the active power infeed, which can in turn adversely affect the network stability.

The following controller behaviors are proposed if the local network section can be characterized as a section with high converter pervasion connected to a network with high converter pervasion. In this case, a continuous voltage control is proposed, in particular a voltage-dependent reactive power infeed and/or the infeed of converter-controlled infeed apparatuses in a voltage impressing mode. In both cases, a voltage control without a dead band is proposed, wherein any deviations already result in a correction action. At least for some converter-controlled infeed apparatuses, therefore, in accordance with the second case, instead of an otherwise customary current-impressing infeed, wherein a current to be fed in is predefined, a voltage-impressing infeed is proposed, wherein infeed is effected such that a voltage is maintained.

Additionally or alternatively, consideration is given to a dynamic network backup with a dead band, wherein preferably a reactive power priority or reactive power prioritization together with a reactive current upper limit is proposed. This controller behavior can be set depending on the converter infeed proportion. Particularly the provision of a reactive current upper limit can be set depending on the converter infeed proportion, in particular such that a reactive current upper limit is predefined only starting from a converter infeed proportion of at least 50%, in particular at least 60%.

In the case of a dynamic network backup with a dead band, a reactive power infeed is effected depending on a voltage deviation. In the case of the voltage deviation, the deviation of the network voltage from the rated voltage is considered, but provision is made of a dead band within which voltage deviations are not taken into account. In particular, provision is made for the dead band to form a range around the rated network voltage, with a lower reference value lying below the rated network voltage and an upper reference value lying above the rated network voltage. The reactive power infeed is then effected depending on the magnitude of the voltage deviation in relation to one of these limits. That is to say that only a voltage deviation above the upper limit value or below the lower limit value is then considered as voltage deviation.

In particular, a reactive power prioritization is provided; accordingly, an active power infeed is reduced if that is necessary in order that the envisaged reactive power can be fed in within a predefined apparent current limit.

For the local network section which can be characterized as a section with high converter pervasion connected to a network with high converter pervasion, a small k-factor is additionally proposed. The k-factor can be defined as described above and has a value that is less than 4, preferably less than 3, and in particular less than 2. This prevents the reactive power from encountering its limits too rapidly.

Preferably, an integral proportion is used particularly in the case of the dynamic network support. The dead band, in particular, makes it possible to prevent a voltage-dependent reactive power infeed from already commencing in the case of small voltage deviations. What can be achieved by means of the integral proportion, however, is that if the deviation is sufficiently large, the corresponding reactive power can be increased further if its infeed does not have a sufficient effect on the voltage. The combination with the dead band makes it possible to prevent the occurrence of a creeping integration in the case of only small voltage deviations.

All these measures take account of the fact that the superordinate network section cannot supply much backup power nor does it have a strong stabilizing property for voltage and frequency. What is basically taken into account is that the local network section including the network sections surrounding it has a high static converter proportion, i.e., a high converter pervasion. The control behavior must therefore be configured such that the local network section can substantially regulate itself such that it operates well, but also such that it can remain connected to the rest of the electrical supply network.

If the local network section does not come under any of these characterizations, then it can be characterized as a section with indefinite behavior. A voltage-dependent reactive power infeed with an average k-factor can be used in that case. The k-factor can then have the value 5, although a value of 4 or 6 is also conceivable, or values in between. The voltage-dependent reactive power infeed can likewise have a dead band behavior, as described above.

Preferably, an adaptive behavior is proposed for the infeed control. Adaptation algorithms can operate in particular such that a desired system behavior in regard to a control process is assumed and this control behavior is compared with a control behavior attained. Adaptations of the control behavior can then be derived from the comparison.

In the simplest case, such adaptations can include the change of a gain factor. If an infeed control is selected and set, for example, which reckons on a reactive power infeed of 50% with a voltage reduction by 10%, but the voltage reduction is actually 20%, then a gain factor of this control behavior can be halved, to take this simple example.

As a result, such an adaptive infeed control can adapt to changed system behaviors and here in particular to system behaviors that are not yet exactly known. Preferably, the gain behavior of the infeed control can be preset depending on the converter infeed proportion and/or it is preset depending on the concrete converter pervasion.

In accordance with one aspect, it is proposed that the control behavior of the infeed control is selected or set depending on a vertical network load of the local network section or superordinate network section, wherein the vertical network load is a correctly signed sum of all power transmissions from a transmission network—connected to the network section—via directly connected transformers.

This is based on the consideration in particular that in global energy supply networks a power balance is compensated for to the greatest possible extent at every point in time. Locally, however, a power surplus and exports from another network section can occur on account of a renewable infeed, but also on account of a conventional generation. The vertical network load then becomes negative and power is exported from the local network section.

Towns and cities and load centers, in particular industrial consumers, are often locally underfed and thus form import zones. They thus import power from other parts of the electrical supply network.

It has also been recognized that although the exports and load flows can change as a result of changes in the conventional generators, nowadays renewable energy sources may be the cause of many changes including overfeedings or underfeedings. The cause thus often resides in converter-controlled infeed apparatuses.

It has been recognized that general weather situations with much wind and sun in some regions can lead to a great overfeeding. Such overfeedings can change over the course of hours. In this regard, by way of example, an export of 6 GW on one day around 16:00 can change to an import of 1 GW by 24:00 on the same day. Such a change can occur for a total network load in the time period of approximately 12 GW. The challenge of the control of the local power balance of the local network section thus arises at least indirectly often as a result of the proportion of the total infeed that is provided by renewable energy sources.

Consequently, with respect to this aspect, too, it is proposed to take account of an actual infeed state of the electrical supply network. The vertical network load can be regarded as a network state. If the infeed control controls the infeed of the electrical power depending on the network load, it thus controls it depending on a network state.

It has also been recognized here that exports can aggravate a local problem because they can weaken the network, but they can also be output via a vertical network load. In such a case, a value of more than 100% can be present for power fed in from renewable energies, relative to the power consumed by consumers of the same network section.

Provision is made here, in particular, for the change to be controlled by converter-controlled infeed apparatuses by way of a change gradient or some other change function in order to avoid an excessively great change.

In particular, depending on the vertical network load of the local network section or superordinate network section, it is proposed to select and/or to set a voltage combination control for a wind farm.

A voltage combination control describes a control in which for a wind farm for ride through of a fault or a disturbance, provision is made of a voltage-dependent reactive power control for each wind power installation of the wind farm, in particular with different characteristic curves for the wind power installations, wherein before and after the disturbance instead of the voltage-dependent reactive power control for each wind power installation, use is made of a reactive power control which is controlled centrally by a farm controller of the wind farm and in which the farm controller predefines a reactive power setpoint value for each wind power installation of the wind farm.

For the voltage-dependent reactive power control for each wind power installation, parameters are preferably set depending on the vertical network load, in particular at least a dead band and/or a gain factor, which can also be referred to as k-factor.

A and/or the described voltage-dependent reactive power control for each wind power installation for ride through of a fault or a disturbance by means of a characteristic curve, namely a voltage-reactive power characteristic curve, can also be referred to as FRT control, with FRT k-factors and an FRT dead band.

Here the network can be frequency- or voltage-softer. For this purpose, it is proposed to use smaller k-factors, which are thus less than 4, preferably less than 3, in particular less than 2. It is thus proposed to adapt in this sense a droop that predefines a voltage-dependent reactive power infeed. The dead band is preferably not changed. Consideration is also given to a change in the prioritization, which involves switching over from reactive power prioritization to active power prioritization if a vertical network load becomes negative.

In accordance with one aspect, it is proposed that the control behavior of the infeed control is set depending on a voltage softness of the local network section or superordinate network section, wherein the voltage softness is defined by a reciprocal of a quotient between a value of a relative reactive power change as change in total reactive power fed into the local network section, relative to maximum reactive power able to be fed into this network section, on the one hand, and a value of a relative voltage change resulting from this change in the fed-in reactive power at a reference point of the local network section, on the other hand. The reactive power change, which can be specified in particular as percentage reactive power change, is thus a change in the reactive power which is normalized to total reactive power able to be fed into the local network section. That can be in particular the sum of the rated values of the reactive powers of all infeed apparatuses of the network section. The relative voltage change can be normalized to a rated voltage at the reference point.

It has been recognized in particular that voltage-soft networks are networks in which the voltage reacts sensitively to a change in the reactive power balance. In this respect, the reactive power balance is the total reactive power fed in. If the latter changes, that can affect the voltage to different extents. The greater the extent to which it affects the voltage, the greater the voltage softness of the relevant electrical supply network or the network section, which has been referred to as network here for simplification.

It has furthermore been recognized that a local voltage softness and a global voltage softness can be differentiated. A local voltage softness can arise particularly if generation power is connected to a very long line or is fed into the latter, and the latter is electrically far away between a network centroid and a generation. Electrically far away means that a large phase angle difference occurs between the point at which the generation power is fed into said long line and the network centroid. Said difference can be more than 25°, in particular more than 45°, or even in particular more than 60°. In this case, a change in the local reactive power balance leads to a great change in the voltage. Therefore, here reference is made to a local voltage softness.

If no centrifugal mass at all or only a very low centrifugal mass is present locally, the influencing of the phase angle, i.e., the large phase angle difference mentioned, also leads to a local frequency change. That then has the effect that the local frequency thereby fluctuates more greatly around an average frequency.

A global voltage softness can occur only in networks having a spatially smaller extent with a small proportion of synchronous generators, in which an influencing of the voltage is actually possible in the first place as a result of a change in the reactive power balance in the entire network. In that case, therefore, the electrical supply network has overall a small proportion of synchronous generators and, therefore, a network topology can be present in which the voltage overall, i.e., in the entire electrical supply network, is also greatly dependent on reactive power changes.

It has been recognized here in particular that a local voltage softness can occur more frequently and can occur in particular in corresponding local network sections. A local voltage softness can occur in particular in a local network section which can be characterized as a section with locally high converter pervasion connected to a weak network. It is proposed, in particular, to take account of a high voltage softness by means of a small k-factor. In particular, it is proposed to choose a small k-factor that is less than 4, preferably less than 3, in particular less than 2, if the voltage softness exceeds a softness reference value. In particular, a value of 25% is proposed as softness reference value.

In accordance with one aspect, it is proposed that the control behavior of the infeed control is set depending on a frequency softness of the local network section or superordinate network section, wherein the frequency softness is defined by a reciprocal of a quotient between a value of a relative, in particular percentage, change in total active power fed into the local network section and the rate of frequency change resulting from this change in the fed-in active power in the network section. The change in the active power fed in can be normalized to the sum of the rated power of all infeed apparatuses of the local network section. The resulting rate of frequency change can likewise be normalized to the rated network frequency per second. Thus, if the frequency changes by 0.1 Hz/s, the resulting normalized rate of frequency change is 0.2.

It has been recognized that, in frequency-soft networks, a small power change can lead to an influencing of the network frequency. It is proposed to take that into account in the control behavior.

It has been recognized in particular that a distinction can be drawn between locally frequency-soft and globally frequency-soft. The frequency softness related to the local network section is thus a local frequency softness. The following should be noted with regard to the local frequency softness. In a network in which a large amount of centrifugal mass is present in a center and small amounts of centrifugal mass are present in an outlying region, the phase angle and thus the frequency can oscillate around an average phase and hence frequency. In this case, the phase difference between network centroid and the long outlying region reacts very sensitively to a change in the local reactive power balance, but also to a change in the active power infeed. Locally absent centrifugal masses lead to this degree of freedom. A certain voltage softness vis-à-vis the network centroid has been recognized as a necessary prerequisite for a local frequency softness. Locally frequency-soft network sections thus arise in electrical supply networks, which can also be referred to as networks for simplification, in which the effective centrifugal mass is distributed nonuniformly in the network.

The taking account in the control behavior is therefore proposed particularly for the local network section with high converter pervasion. In particular, it is proposed for local network sections which can be characterized as a section with high converter pervasion connected to a strong network. The superordinate network section here has a high centrifugal mass index, while the local network section has instead a high converter pervasion and thus a low centrifugal mass index. Referring to the above explanation, the local network section here can thus be regarded as an outlying region with little centrifugal mass, which is additionally remote from the center with much centrifugal mass. Of course, a plurality of centers with much centrifugal mass can also be present here, whereas little centrifugal mass is present in the local network section, however.

It has furthermore been recognized that globally frequency-soft networks are networks having a globally high proportion of a renewable generation and little centrifugal mass. Here, therefore, generally much power is fed in from renewable energy sources. Taking account in the control behavior can be advantageous here, too.

In particular, it is proposed to take account of the control behavior in such a way that a low gain factor is provided in the case of a frequency-dependent power control. Said gain factor can also be referred to as power gain factor. It can be defined as the quotient of a normalized power change relative to a normalized frequency change. It is proposed to normalize the power change to the rated power of the corresponding infeed apparatus and to specify the frequency change in Hz. A small power gain is then considered to be a value that is less than 1/Hz. A great frequency softness is assumed if its value, on the basis of the normalized definition, is one second or above that.

In accordance with one aspect, it is proposed that the control behavior of the infeed control is set depending on a renewable capacity factor of the local network section or superordinate network section, wherein the renewable capacity factor is defined by a quotient between total power, in particular active power, fed in by all energy sources of fluctuating power that feed into the local network section or superordinate network section, respectively, in particular of all wind power installations and photovoltaic installations, and maximum power able to be fed in by all these energy sources of fluctuating power, this maximum power being calculated in particular as a sum of all rated power values of these energy sources of fluctuating power. The renewable capacity factor is thus the quotient of power fed in to maximum power able to be fed in, but in each case only relative to the energy sources of fluctuating power.

It has been recognized in particular here that in addition to the consideration of a converter pervasion and also in addition to the consideration of a converter infeed proportion, a general network situation and thus property can be derived from said renewable capacity factor. The renewable capacity factor thus specifies how much of the power able to be fed in by the renewable energy sources is actually presently being fed in.

The renewable capacity factor thus denotes the present, and upon consideration of the local network section the local, operating point of the renewable infeed power in relation to the installed power of these infeed apparatuses. If the factor is approximately 90%, or above that, a full capacity utilization of the pool of the renewable energy sources present can be assumed. It can then also be assumed that the renewable infeed power cannot increase further. The renewable infeed power thus denotes the power fed in by all renewable energy sources.

Disturbances in a negative direction are thus more probable than in a positive direction. It is therefore more likely to be expected that said renewable infeed power will more likely decrease than increase. On the other hand, in the case of a capacity factor of less than 10%, it can be assumed that many of the infeed apparatuses which feed in from renewable energies, i.e., many of the renewable energy sources, are no longer connected to the electrical supply network and/or a dynamic fault current infeed is reduced.

This can be taken into account in the control behavior. In particular, this can be taken into account such that control functions which change an active power infeed for control purposes are correspondingly adapted depending on the renewable capacity factor. For the converter-controlled infeed apparatuses, provision can then be made for avoiding a control with active power increase or limiting it with regard to the active power if the renewable capacity factor of the relevant network section is high, in particular is at least above 80%. For the converter-controlled infeed apparatuses, provision can additionally be made for avoiding control functions which reduce an active power infeed or for limiting the reduction of the active power infeed if the renewable capacity factor is low, in particular is below 20%. Conversely, for the infeed apparatuses which are not converter-controlled, provision can be made for these to increase their active power infeed, in particular to increase a gain factor with respect to the active power infeed. That can be provided in particular for a high renewable capacity factor, that is to say if the renewable capacity factor is above 80%.

In accordance with one aspect, it is proposed that the control behavior of the infeed control has at least one control property from the list of the following control properties.

One control property of the list is to provide a selection possibility between reactive-power-prioritized driving mode and active-power-prioritized driving mode, wherein in the case of the reactive-power-prioritized driving mode active power fed in for complying with an apparent power limit is limited, whereas in the case of the active-power-prioritized driving mode reactive power fed in for complying with an apparent power limit is limited. In particular, it is proposed to effect this selection possibility depending on a characterization of the local network section. A description has already been given above of when a reactive-power-prioritized driving mode and when an active-power-prioritized driving mode should be used as control behavior.

As a further control property, a setting possibility between a proportion of a reactive power limitation and a proportion of an active power limitation upon an apparent power limit being reached is proposed. In this respect, too, explanations have already been given above. In particular, it is proposed to provide a reactive power limitation if consideration is also given to a reactive-power-prioritized driving mode. Likewise, provision is made for providing an active power limitation if consideration is also given to an active-power-prioritized driving mode.

As a further control property of the list, provision is made of a setting possibility of a voltage dead band, wherein the voltage dead band specifies a voltage range around a rated network voltage in which an additional reactive power infeed for voltage backup does not occur. Particularly in the case of a great frequency softness, it is proposed to set a small voltage dead band in order, in such networks, to keep the voltage as stable and/or high as possible with a fixed voltage control in order to keep this as far away as possible from stability limits.

As a further control property from the list, it is proposed to provide settable gain factors for voltage backup, wherein the gain factors specify a ratio of a reactive power change to be effected to a detected voltage change. Consequently, for a controller that controls a voltage-dependent reactive power infeed, a setability is provided. As a result, the effect of a voltage-dependent reactive power change can be set in terms of its intensity. A particularly low gain factor should be provided particularly if the local network section has a high voltage softness. In this case, the local network section reacts very sensitively to reactive power changes, such that the latter can be kept small by means of this small gain.

A wind energy system comprising at least one wind power installation is also proposed. The wind energy system can thus concern a single wind power installation or a wind farm. If it concerns a plurality of wind power installations then the latter feed in via the same network connection point.

The wind energy system, i.e., the wind power installation or the wind farm, is thus provided for feeding electrical power into an electrical supply network, wherein the wind energy system forms a converter-controlled infeed apparatus, which feeds electrical power into the electrical supply network by means of at least one converter, wherein the converter-controlled infeed apparatus feeds into a local network section of the electrical supply network at a network connection point, the electrical supply network has the converter-controlled infeed apparatus and further infeed apparatuses, for feeding in electrical power, referred to as infeed power, and consumers for consuming electrical power, referred to as consumption power, the local network section has a high converter pervasion, wherein a converter pervasion specifies a ratio of power able to be fed in by means of converters to total power able to be fed in by all infeed apparatuses, and a high converter pervasion is defined by a value of at least 50%, and an infeed control is provided, and the electrical power is fed in by means of the infeed control, which controls the infeed of the electrical power depending on a network state of the electrical supply network, wherein the infeed control has a controller behavior which characterizes an input/output behavior of the infeed control, the local network section can be characterized by a network characteristic, and the network characteristic is dependent on at least one property of the local network section and in addition is dependent on at least one property of a further network section of the electrical supply network, said further network section being connected to the local network section, or is dependent on the fact that no further network section is present, and the control behavior is selected or set depending on the network characteristic of the local network section.

In accordance with one aspect, it is proposed that the wind energy system, in particular the infeed control and/or a control unit that is part of the wind energy system, is prepared to carry out a method according to any of the embodiments described above. The advantageous method can thus be implemented by the wind energy system. The control unit, in particular, also makes it possible to effect or to coordinate controls which are to be carried out outside the wind energy system.

BRIEF DESCRIPTION OF THE SEVERAL VIEWS OF THE DRAWINGS

The invention is explained in greater detail by way of example below on the basis of embodiments with reference to the figures.

DETAILED DESCRIPTION

Figure 1:
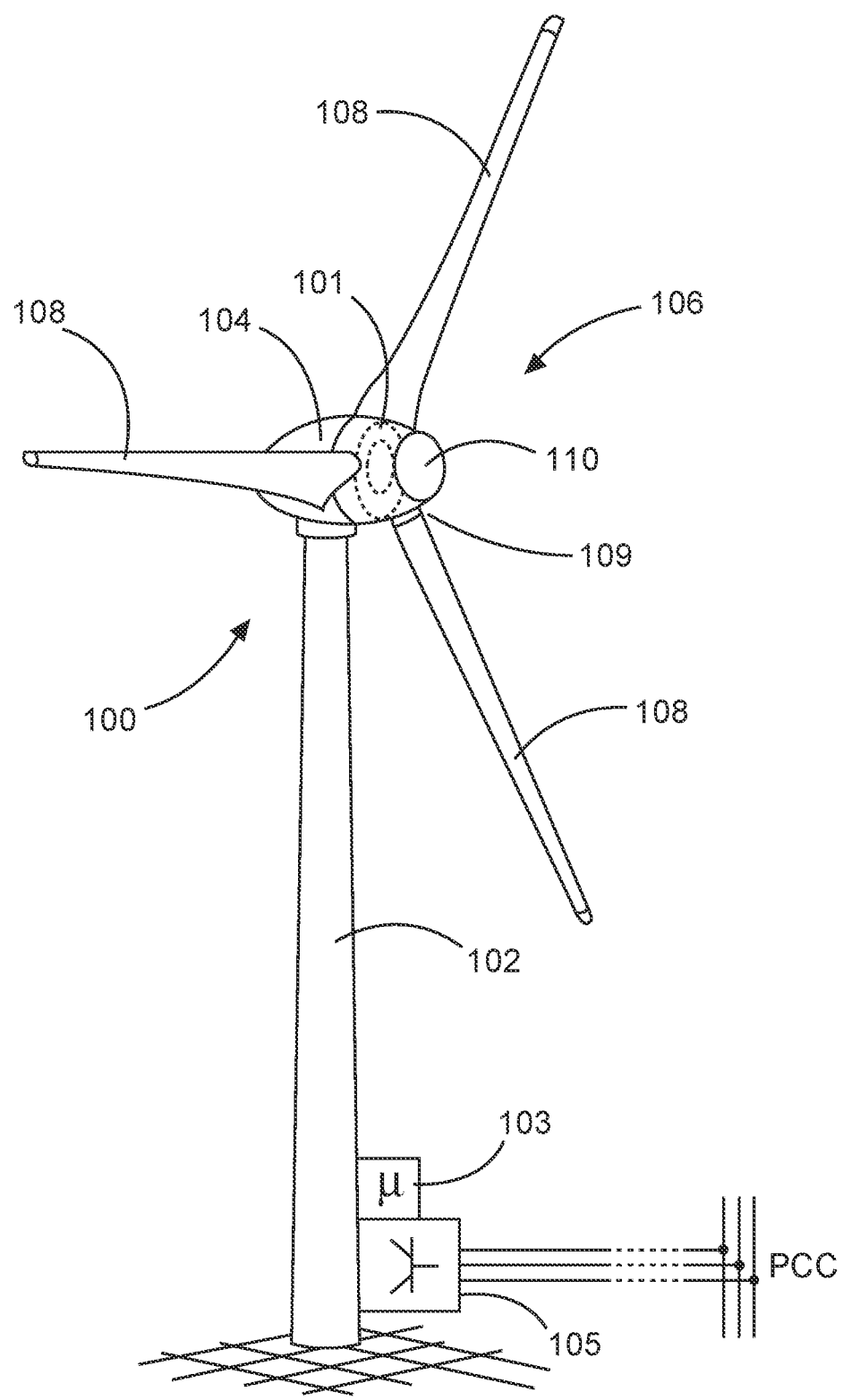
FIG. 1 shows a wind power installation in a perspective illustration.

FIG. 1 shows a schematic illustration of a wind power installation. The wind power installation 100 comprises a tower 102 and a nacelle 104 on the tower 102. An aerodynamic rotor 106 comprising three rotor blades 108 and a spinner 110 is provided on the nacelle 104. The aerodynamic rotor 106 is caused to effect a rotational movement by the wind during operation of the wind power installation and thereby also rotates an electrodynamic rotor of a generator, which is coupled to the aerodynamic rotor 106 directly or indirectly. The electrical generator is arranged in the nacelle 104 and generates electrical energy. The pitch angles of the rotor blades 108 can be varied by pitch motors on the rotor blade roots 109 of the respective rotor blades 108.

In this case, the wind power installation 100 comprises an electrical generator 101, indicated in the nacelle 104. Electrical power can be generated by means of the generator 101. An infeed unit 105, which can be configured as an inverter, in particular, is provided for feeding in electrical power. It is thus possible to generate a three-phase infeed current and/or a three-phase infeed voltage according to amplitude, frequency and phase, for infeed at a network connection point PCC. That can be effected directly or else jointly with further wind power installations in a wind farm. An installation controller 103 is provided for controlling the wind power installation 100 and also the infeed unit 105. The installation controller 103 can also acquire predefined values from an external source, in particular from a central farm computer.

Figure 2:
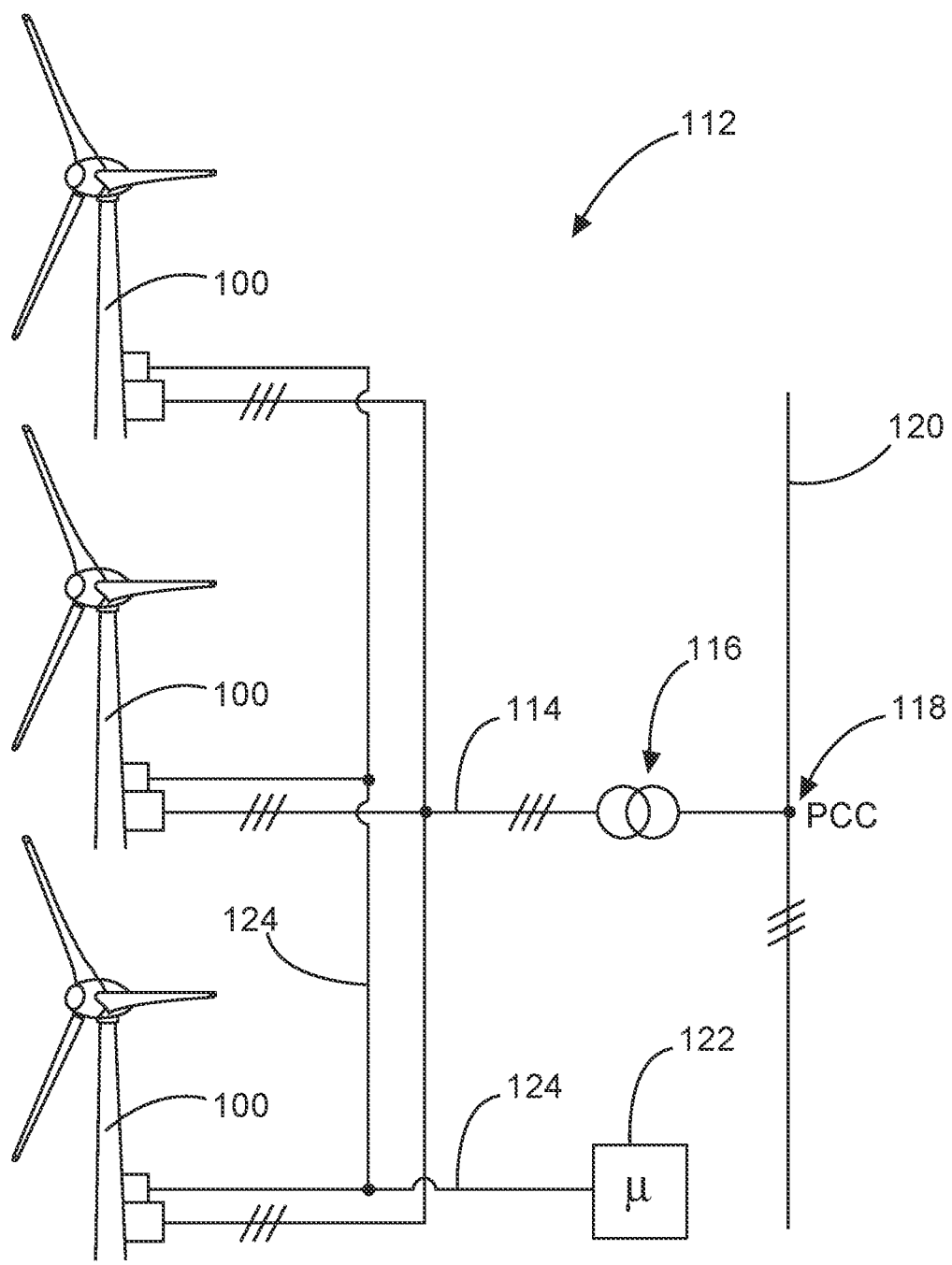
FIG. 2 shows a wind farm in a schematic illustration.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a wind farm 112, which does not show a controller, for example, even though a controller is present, of course. Moreover, for example, the farm network 114 can be configured differently, with for example a transformer also being present at the output of each wind power installation 100, to mention just one different exemplary embodiment.

The wind farm 112 additionally comprises a central farm computer 122. The latter can be connected to the wind power installations 100 via data lines 124, or in a wireless manner, in order thereby to exchange data with the wind power installations and in particular to acquire measured values from the wind power installations 100 and to transmit control values to the wind power installations 100.

FIGS. 3 to 6 show in each case an electrical supply network or a part thereof, at least in each case a local network section. With reference to FIGS. 3 to 6, the intention is to explain different network topologies and how local network sections can be characterized in a manner dependent thereon. The simplified illustrations often lack transformers and network disconnecting switches for the sake of simplification, although transformers are depicted at some points.

Figure 3:
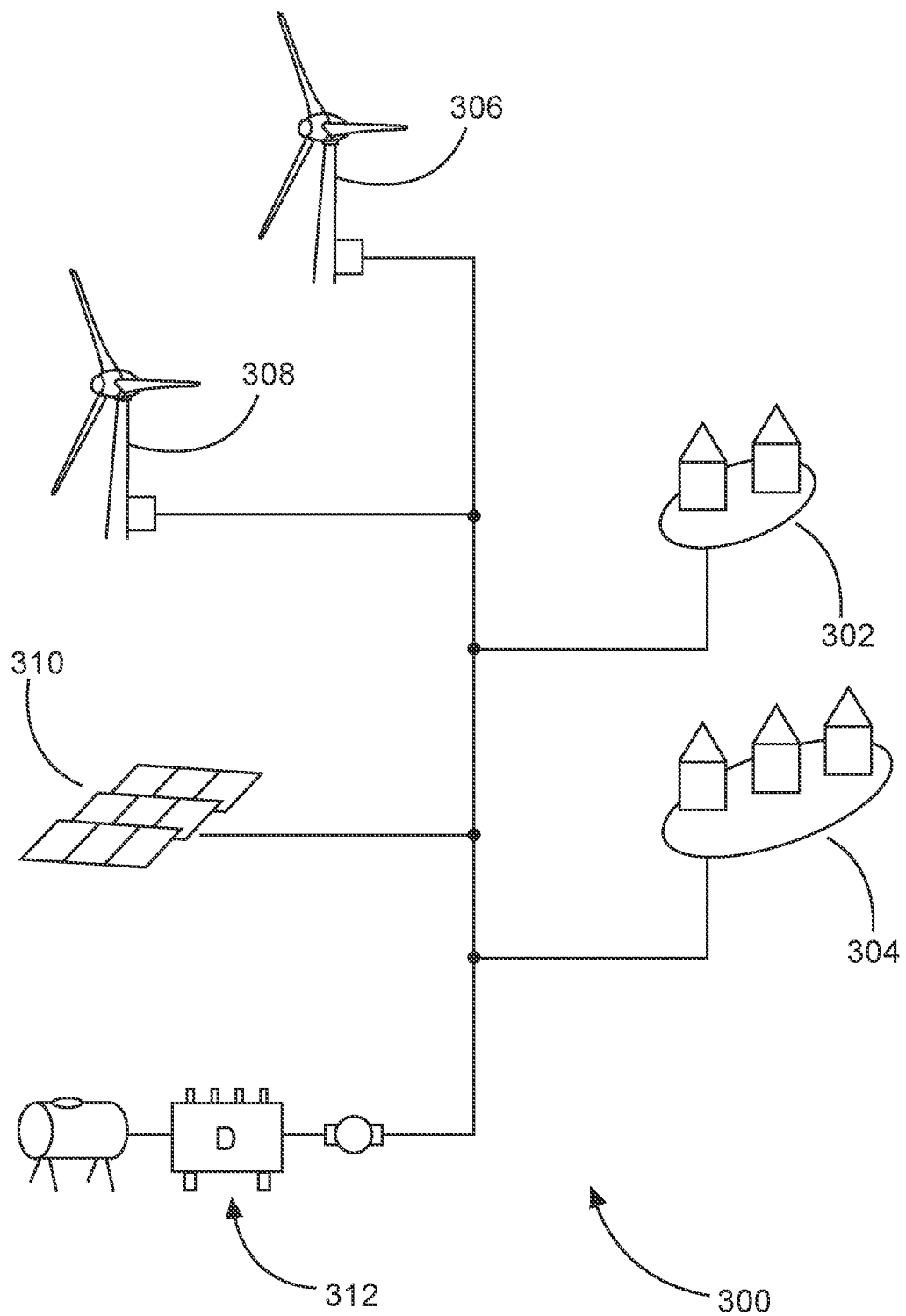
FIGS. 3-6 in each case illustrate an electrical supply network or a part thereof for characterizing different local network sections.

FIG. 3 shows a local network section 300 which can be characterized as an island network. This exemplary local network section, which of course, like all the other local network sections as shown, is greatly simplified, has for example three consumers and four generators. A first and a second village 302 and 304 are illustrated by way of example as consumers. A first and a second wind power installation 306 and 308, a photovoltaic installation 310 and a diesel generator 312 are illustrated as generators. In this respect, this local network section 300 is complete and self-contained. It has no contact with any other external network or network section. For simplification here, the term network denotes an electrical supply network and network section accordingly denotes a section of an electrical supply network. That also applies to the rest of the figures and embodiments.

This local network section 300 embodied as an island network forms a typical island network in this respect. It is endeavored as far as possible to supply the consumers, here just villages, by means of wind power installations and photovoltaic installations. If that is not possible, the diesel generator 312 can start up and ensure the supply. It is also conceivable for the diesel generator to run all the time, in order thereby to function as a network forming element. Its power output can then be varied as necessary.

In this respect, this local network section 300 has a high converter pervasion, on the basis of the fact that the rated power of the diesel generator is in each case lower than that of the two wind power installations 306 or 308 and also the photovoltaic installation 310. Consequently, the modes of behavior of converter-controlled infeed apparatuses are dominant for this local network section 300 which can be characterized as an island network.

Figure 4:
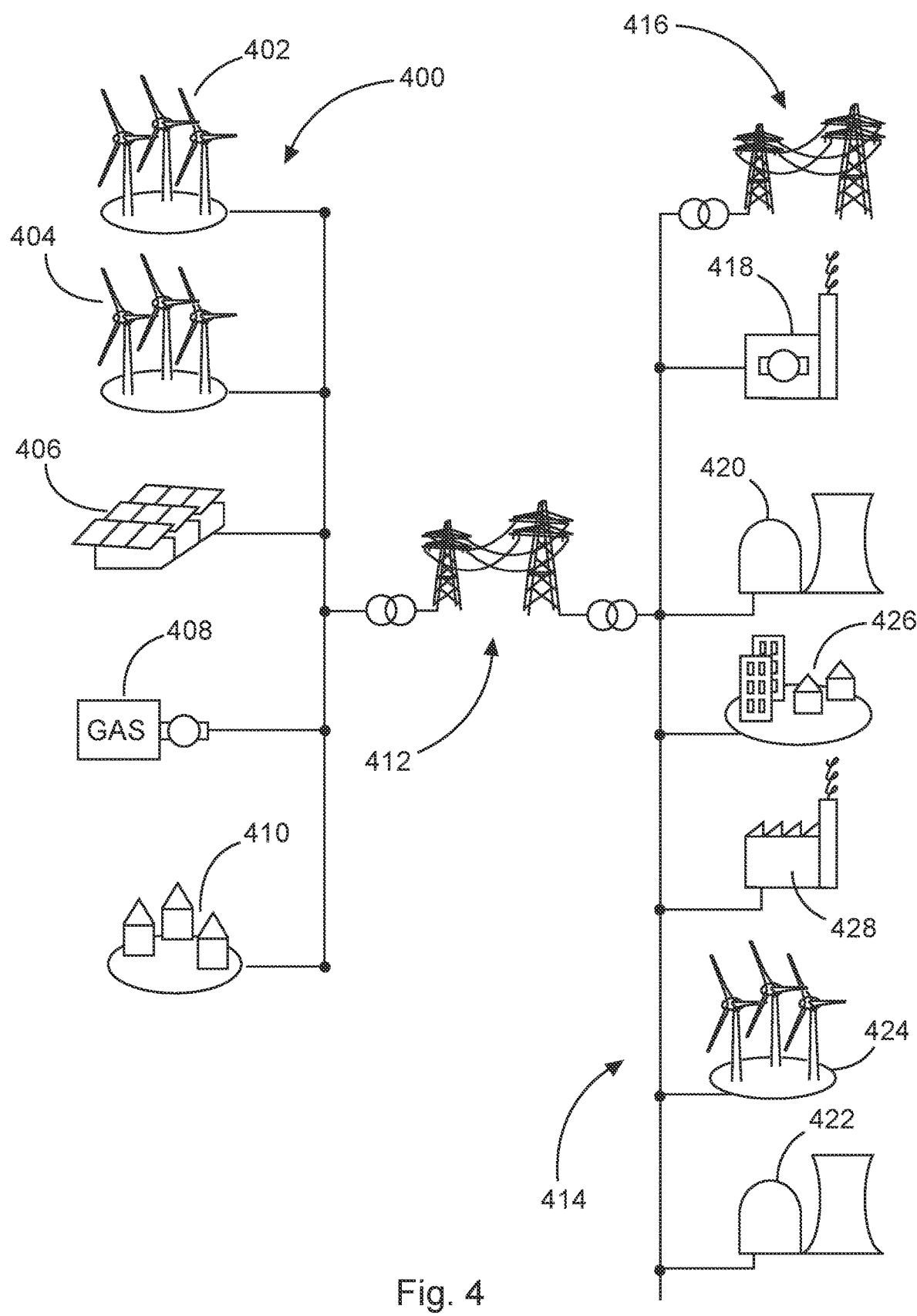

FIG. 4 shows a local network section 400 which can be characterized as a section with high converter pervasion connected to a strong network. This local network section 400 has a first and a second wind farm 402 and 404, and also a photovoltaic installation 406. Moreover, a gas turbine 408 is also provided, as is a village 410 as consumer. Here, too, it is assumed that the gas turbine 408 has a lower rated power than at least each of the individual wind farms 402 and 404 and also than the photovoltaic installation 406. Consequently, this local network section 400 also has a high converter pervasion.

The local network section 400 is connected to a superordinate network section 414 via a first high-voltage connection 412. In this case, the first high-voltage connection 412 is intended to illustrate that the superordinate network section 414 is superordinate. A second high-voltage connection 416 is intended to symbolize that the superordinate network section 414 is connected to further sections of an electrical supply network via this second high-voltage connection 416 and as a result is also part of this electrical supply network. The first and second high-voltage connections 412 and 416 serve for illustration and they do not preclude for example the superordinate network section 414 itself having a high voltage, whether completely or only in partial sections. This symbolism is also analogously applicable to the ensuing FIGS. 5 and 6.

In any case the superordinate network section 414 illustrated by way of example has a first, second and third large power plant 418, 420 and 422, respectively. A wind farm 424 is also present. A town/city 426 and a factory 428 are present as consumers.

Assuming that each of the three large power plants 418, 420 and 422 has a rated power which is in each case at least of the same magnitude as that of the wind farm 424, the large power plants are thus dominant. These large power plants feed in through a synchronous generator coupled directly to the network and for the superordinate network section 414 this results in a large centrifugal mass index, which is thus at least ¾, specifically if the rated powers of the three large power plants 418, 420 and 422 were in each case of exactly the same magnitude as the rated power of the wind farm 424.

If they are greater, however, the centrifugal mass index is accordingly even higher than ¾, i.e., higher than 75%.

Consequently, FIG. 4 shows with the local network section 400 a local network section which can be characterized as a section with high converter pervasion connected to a strong network.

Figure 5:
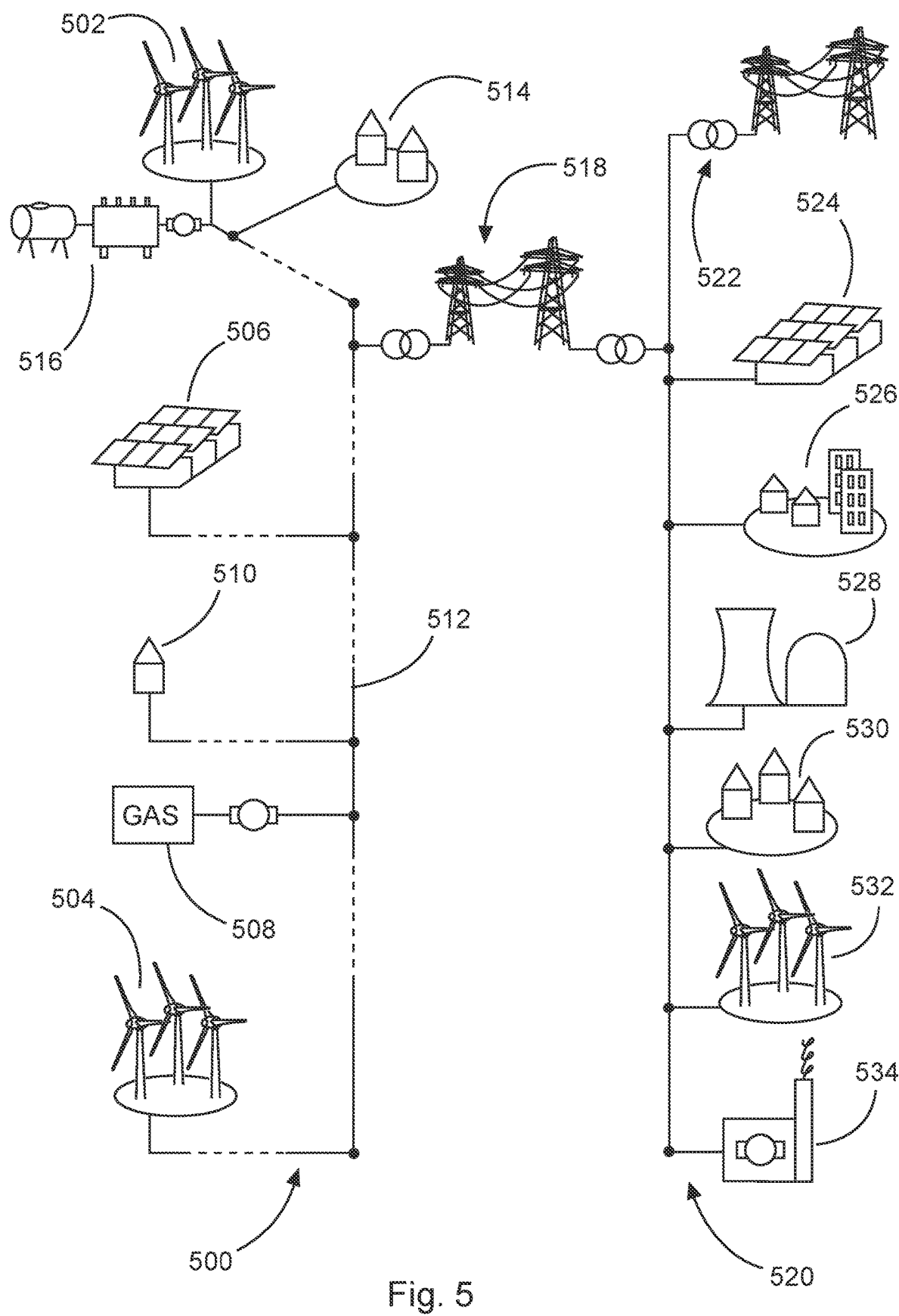
Figure 6:
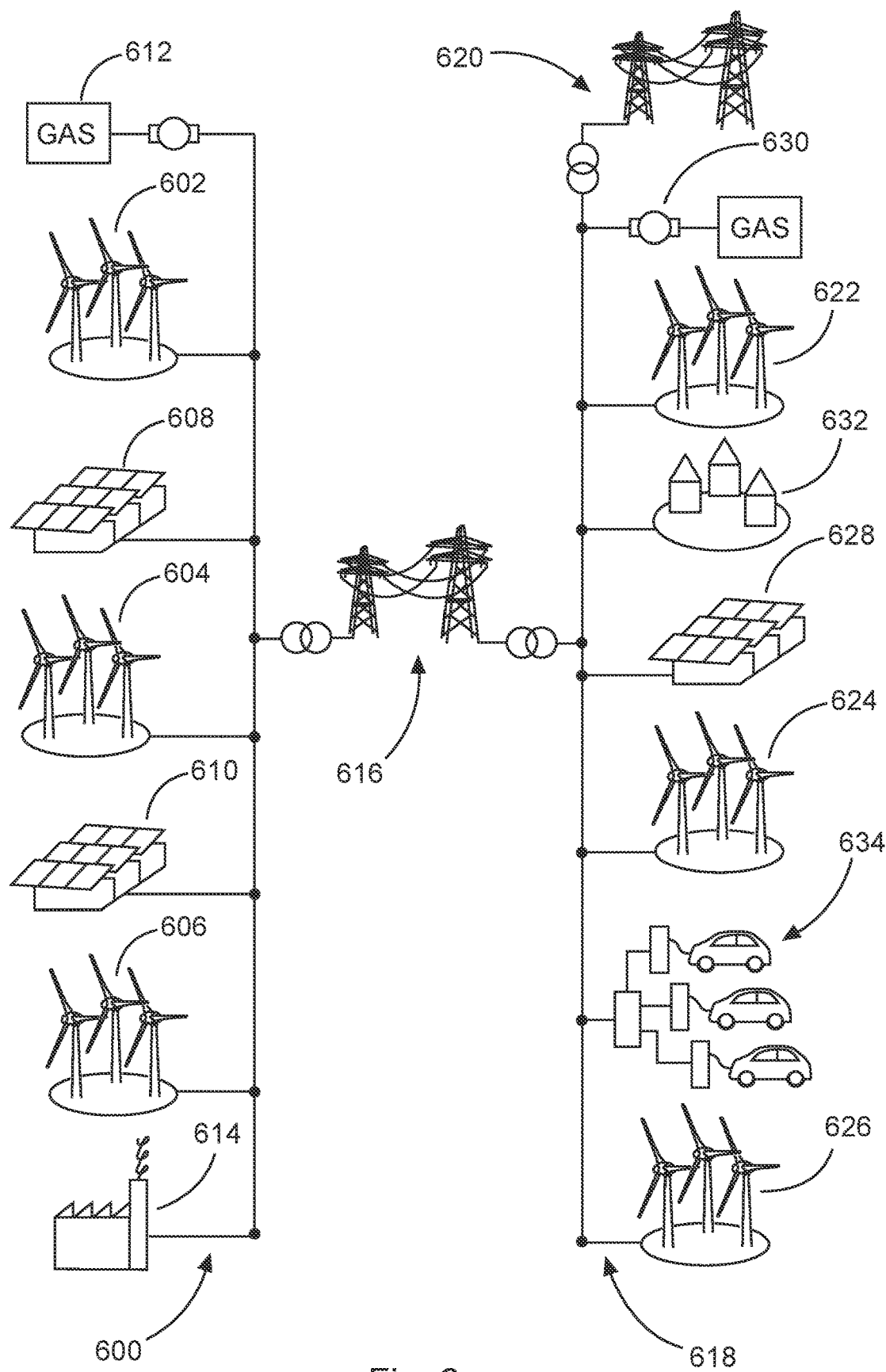

With reference to this FIG. 4, but also with reference to the ensuing FIGS. 5 and 6, it is evident that the characterization is substantially determined by the topology present, i.e., what kind of infeed apparatuses are present. However, neither the local network section 400 nor the superordinate network section 414 contains exclusively only one type of infeed apparatus. The converter-controlled infeed apparatuses are dominant in the case of the local network section 400, while the conventional infeed apparatuses are dominant in the case of the superordinate network section 414. That also affects a converter infeed proportion stating how much power can actually presently be fed in by the respective types of infeed apparatus.

As a result, however, the converter infeed proportion is not fixed. Depending on the situation, the other type of infeed apparatus could also be dominant in each case. If there is little wind, the gas turbine 408 may be dominant at night in the case of the local network section 400 in FIG. 4. If there is much wind and little power demand, e.g., on a stormy night, the wind farm 424 can be dominant in the case of the superordinate network section 414 and thus lead to a high converter infeed proportion. All this can be taken into account in addition to the characterization of the local network section, which characterization does not change as a result. That also applies to the two following embodiments described in association with FIGS. 5 and 6.

FIG. 5 shows, on the left-hand side, a local network section 500 which can be characterized as a section with locally high converter pervasion connected to a weak network. This local network section has a first and a second wind farm 502 and 504, respectively. Moreover, a photovoltaic installation 506 and a gas turbine 508 are present as further infeed apparatuses. In addition, a small settlement 510 is connected to the local network section 500.

The two wind farms 502 and 504 and the photovoltaic installation 506 and also the small settlement 510 are symbolically connected to a main line 512 in each case via partly dashed lines. The main line 512 in part also has dashed lines. This is intended to indicate that these three infeed apparatuses and also the small settlement 510 are arranged at a great spatial distance from one another and in particular from the main line 512. Basically, each of the two wind farms 502, 504, the photovoltaic installation 506 and also the small settlement 510 are connected to the main line 512 via a long spur line. Such a spur line can have a length of 100 kilometer (km), for example.

This results in a small short circuit ratio for the three generators 502, 504 and 506 mentioned, since the local network section 500 cannot provide as much short circuit power at these generators on account of the long spur lines. Such structures may occur particularly in large, sparsely populated areas in which the respective renewable generators are set up at correspondingly suitable locations, which may be far away from one another. Only the gas turbine 508 will expediently be set up at a suitable point directly alongside or at the main line 512.

The local network section 500 is therefore a section with locally high converter pervasion. Each of the two wind farms 502 and 504 and also the photovoltaic installation 506 inherently have a high converter pervasion, which specifically can be 100%. However, it is also conceivable that such a wind farm or such a photovoltaic installation is not arranged in a completely solitary fashion, rather that a settlement is in the vicinity, and optionally, in order for example to ensure the supply autonomy of the settlement, is also arranged at said generator. That is illustrated for the first wind farm 502 by the village 514 and the diesel generator 516. In this case, the diesel generator 516 has the effect that for the first wind farm 502 the converter pervasion is at least below 100%. However, since a diesel generator often has a lower rated power than a wind power installation and therefore has a rated power that is much lower still than that of a wind farm, the converter pervasion in the region of the first wind farm 502 is nevertheless still very high.

The local network section 500 is connected to a superordinate network section 520 via a first high-voltage connection 518. A second high-voltage connection 522 illustrates that the superordinate network section 520 is connected to further parts of an electrical supply network.

The superordinate network section 520 has a photovoltaic installation 524, a town/city 526, a first conventional generator 528, a village 530, a wind farm 532 and a second conventional generator 534.

The superordinate network section 520 thus basically has a good mixture of different generators. Assuming that the four generators mentioned each have an identical rated power, this results in a converter pervasion of 50% and also a centrifugal mass index of 50%. The local network section 500 can thus be characterized as a section with locally high converter pervasion connected to a weak network. Although the superordinate network section 520 as such need not be a weak network section, it is also not so dominant that it could provide a high level of backup for the local network section 500. An additional problem is that a backup power transmission is also limited by the fact that the local network section 500 has locally widely distributed generators which in this case are connected with a small short circuit ratio.

There is also consideration of the fact that the transmission line 518 is very long and the network section 520 as a whole is linked very weakly. Even if the network section 520 had a high centrifugal mass index, a backup would then scarcely be possible via the one line 518.

FIG. 6 shows a local network section 600, namely on the left-side of the figure, which can be characterized as a section with high converter pervasion connected to a network with high converter pervasion. This local network section has a first, a second and a third wind farm 602, 604 and 606, and also a first and a second photovoltaic installation 608 and 610. Moreover, a gas turbine 612 is present, and also a factory 614 as consumer. The local network section 600 thus has a high converter pervasion. When there is much wind and much sun, more power will be generated than can be consumed by the factory 614. The local network section 600 will then export power, in order not to have to be limited. That can be effected via the first high-voltage connection 616 to the superordinate network section 618. Possibly, the superordinate network section 618 itself also has to export power and the power can then be transmitted via the second high-voltage connection 620 to a further network section of an electrical supply network.

The superordinate network section 618 illustrated here itself has a fourth, a fifth and a sixth wind farm 622, 624 and 626, and also a photovoltaic installation 628. Moreover, a gas turbine 630 is also provided. A village 632 and also an electric charging station 634 are present as consumers.

The superordinate network section 618 thus itself has a high converter pervasion. The two consumers, i.e., the village 632 and the electric charging station 634, will consume significantly less power than can be generated by these converter-controlled or renewable generators in the normal case. The superordinate network section 618 will thus itself also often export power, namely via the second high-voltage connection 620.

The local network section 600 can thus be characterized as a section with high converter pervasion connected to a network with high converter pervasion. As a precaution, it is pointed out that the term "network" in this and other characterizations is not intended to mean that the entire network has the corresponding property, i.e., here the high converter pervasion, rather that the superordinate network section has this property, i.e., here the high converter pervasion.

In FIG. 6, it is possible to elucidate particularly well an effect that arises if there is a great change in the wind speed and/or the insolation. Specifically, there is then a fluctuation particularly in the export of power both for the local network section 600 and for the superordinate network section 618. By virtue of the fact that there is a mixture of wind farms and photovoltaic installations, a certain compensation does indeed arise because both energy sources more likely act in opposing ways, but overall a great fluctuation nevertheless remains and can lead to the abovementioned fluctuations of the export power. The present situation of the local network section 600 in FIG. 6 may be able to be represented well by a renewable capacity factor. The latter denotes the sum of the powers fed in by the first, second and third wind farms 602, 604 and 606 and also the first and second photovoltaic installations 608 and 610 with respect to the sum of their rated powers.

Figure 7:
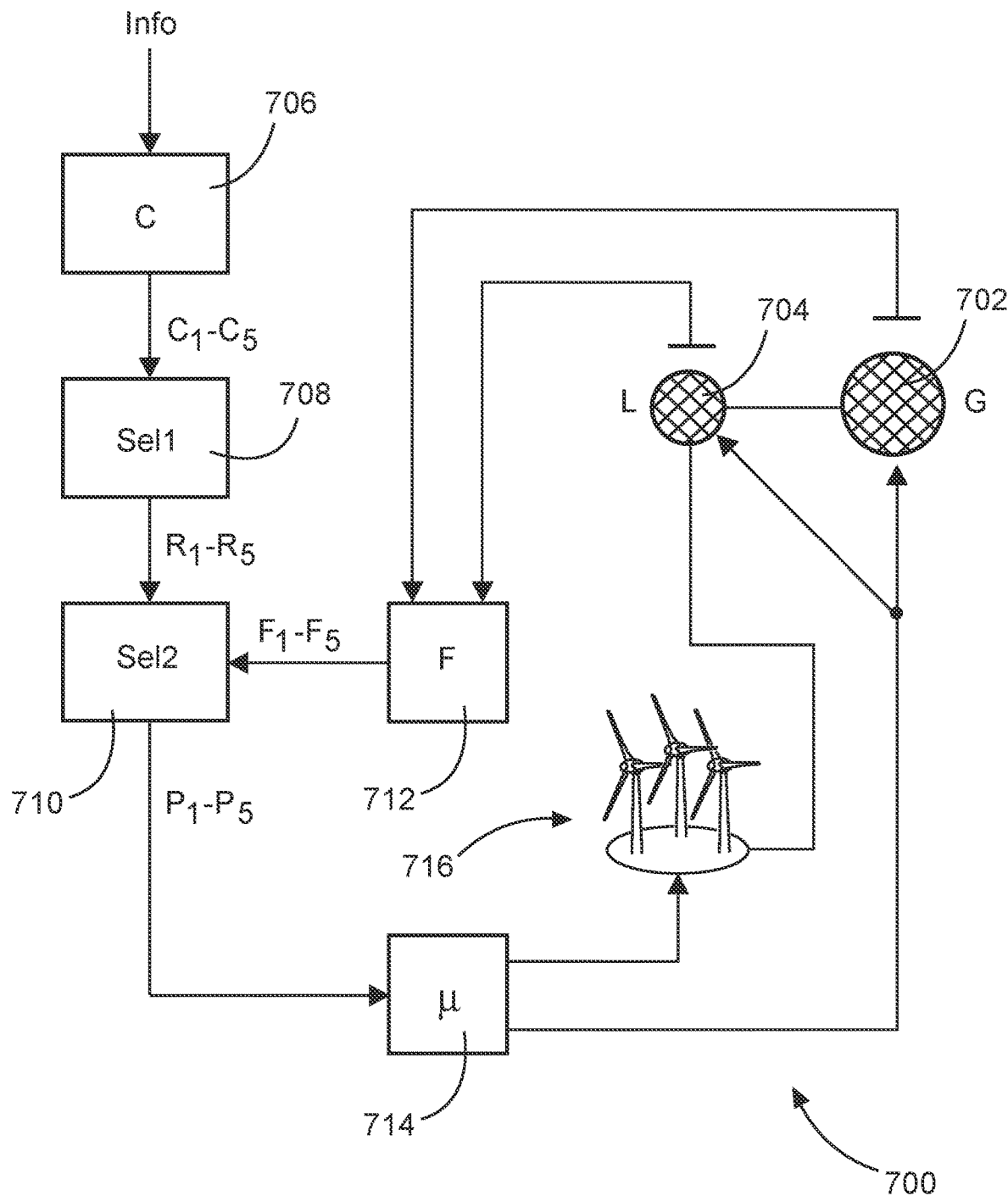
FIG. 7 shows a selection and control scheme in a simplified schematic illustration.

FIG. 7 shows a selection and control diagram 700 in a very simplified illustration. The diagram proceeds from an electrical supply network 702 with a connected local network section 704. The electrical supply network 702 is understood as a superordinate network, which can also be referred to as a global network, without having to encompass the entire globe, and is therefore identified by the letter G.

The local network section 704 can be characterized. This characterization is substantially dependent on the topology and will substantially not change. Although it can change as a result of opening and disconnection of network disconnecting switches, it should essentially be assumed that most of the network disconnecting switches are predominantly closed.

At any rate such a characterization can be stored in the characterization block 706. That does not preclude this characterization also being able to be changed. One possibility is for corresponding information to be input into said characterization block 706 in order then to determine the corresponding characterization. Such information can be input into said characterization block 706. For this purpose, for example stored values can be used, or measured values, which is not illustrated any further here in FIG. 7.

The characterization block can then establish a corresponding characterization or provide it in some other way and output it. That is illustrated by exemplary characterizations $C_1$ to $C_5$.

These characterizations can then be input into the first selection block 708. In particular depending on the characterization obtained, the first selection block 708 can select a controller or select a controller property and output the result. These controllers or controller properties that can be output there are designated symbolically as $R_1$ to $R_5$. However, there need not necessarily be five controller types from which selection is made, rather there may also be a larger or smaller number. That analogously also applies, moreover, to the characteristics illustrated by $C_1$ to $C_5$.

In this regard, therefore, for example one controller type, e.g., $R_2$, can be selected and input into the second selection block 710. The second selection block additionally takes account of further features which are input into it as features $F_1$ to $F_5$. That, too, should be understood merely as symbolic. In particular, it is conceivable here, however, that not just one of the features but rather actually a plurality or all of the features conceivable in principle are input.

Such features $F_1$ to $F_5$ can be a network state, such as a converter infeed proportion. The converter infeed proportion relates to the power presently being fed in by converter infeed apparatuses. One of the features can also concern the size of a vertical network load. Said vertical network load can denote the power transmission from the local network section 704 to the rest of the electrical supply network 702.

A further feature can be information about the voltage softness of the local network section. Yet another feature can be information about the frequency softness of the local network section. A renewable capacity factor can also be a property.

All these properties can presently be detected at the local network section 704 or the rest of the electrical supply network 702 and be input into the detection block 712 for detecting the features. In this respect, the detection block 712 is a detection block for the symbolically mentioned features $F_1$ to $F_5$. There may also be more or fewer features, of course.

The second selection block 710 then takes account of the controller type, which it obtained from the first selection block 708, and additionally the further features $F_1$ to $F_5$. It can output as the result a parameterization or other setting of a control behavior to be used. That is symbolized by the parameterizations $P_1$ to $P_5$ output by the second selection block 710. In particular, therefore, only one parameterization, i.e., for example one $P_3$, is output.

The fact that the first selection block selects a controller type and the second selection block parameterizes the latter is only one possibility, however. It is also conceivable that the second selection block effects supplementations such as specific fault strategies, for example, which are supplemented to the controller type. The controller type can provide a frequency-dependent power control, for example. The latter can be parameterized by the second selection block and/or a behavior for ride through of a network fault can additionally be supplemented.

However, it is also conceivable that the first selection block makes available a plurality of controller types for selection and transfers them to the second selection block 710. The second selection block can then effect a further selection and/or effect a parameterization and/or supplement a control behavior.

At any rate the result output by the second selection block 710 is passed to a superordinate control unit 714. The superordinate control unit can itself be an infeed controller. However, it preferably distributes the control behavior that was predefined by the second selection block 710 to further units. That includes forwarding the control behavior to concrete infeed apparatuses, namely to the wind farm 716 depicted by way of example.

The wind farm 716 can itself have a farm controller or a central farm control unit and there implement one part of the control behavior and forward a further part to the individual wind power installations. In particular, a division is conceivable which involves a general power control and general reactive power control that should be effected by the wind farm being controlled by such a central farm controller. Controller behaviors concerning in particular the ride through of a network fault are transferred to the individual wind power installations in order that the latter can react rapidly to corresponding measured values and can implement the fault ride through mentioned by way of example.

Moreover, the control behavior or a part thereof can be passed from the superordinate control unit 714 to the local network section 704 and the rest of the electrical supply network 702. It should be taken into consideration here in particular that different tasks may be included in the control behavior.

The local network section can acquire in particular such tasks which have already been explained by way of example for the wind farm 716. However, there are additionally further possibilities such as the actuation of network disconnecting switches. The coordination of a plurality of renewable infeed apparatuses of the local network section is also conceivable. This can include the setting of the proportion of a voltage-impressing driving mode with respect to a current-impressing driving mode. If such a proportion is provided for the entire local network section, all converter-controlled infeed apparatuses of the local network section have to be coordinated for this. It may often not be sufficient simply for each converter-controlled infeed apparatus per se to implement the corresponding ratio, since converter-controlled infeed apparatuses may be present which are not suitable for a voltage-impressing infeed and their proportion must then be taken over by other converter-controlled infeed apparatuses.

The rest of the electrical supply network 702 can derive from a control behavior, for example, the extent to which it has to be able to implement the taking up of a power transmission. If a characterization of the local network section as a section with high converter pervasion connected to a strong network is present, for example, and if a high converter infeed proportion has additionally been recognized for the local network section, then that can mean for the control strategy, i.e., the derived control behavior, that the network section superordinate to the local network section expects a high export power. That can at least mean that necessary transmission paths are as far as possible not separated.

It can also mean for the superordinate network section that the latter at least partly shuts down conventional generators in order to conserve their primary energy if an appropriate amount of renewable energy or power is available in the local network section.

Figure 8:
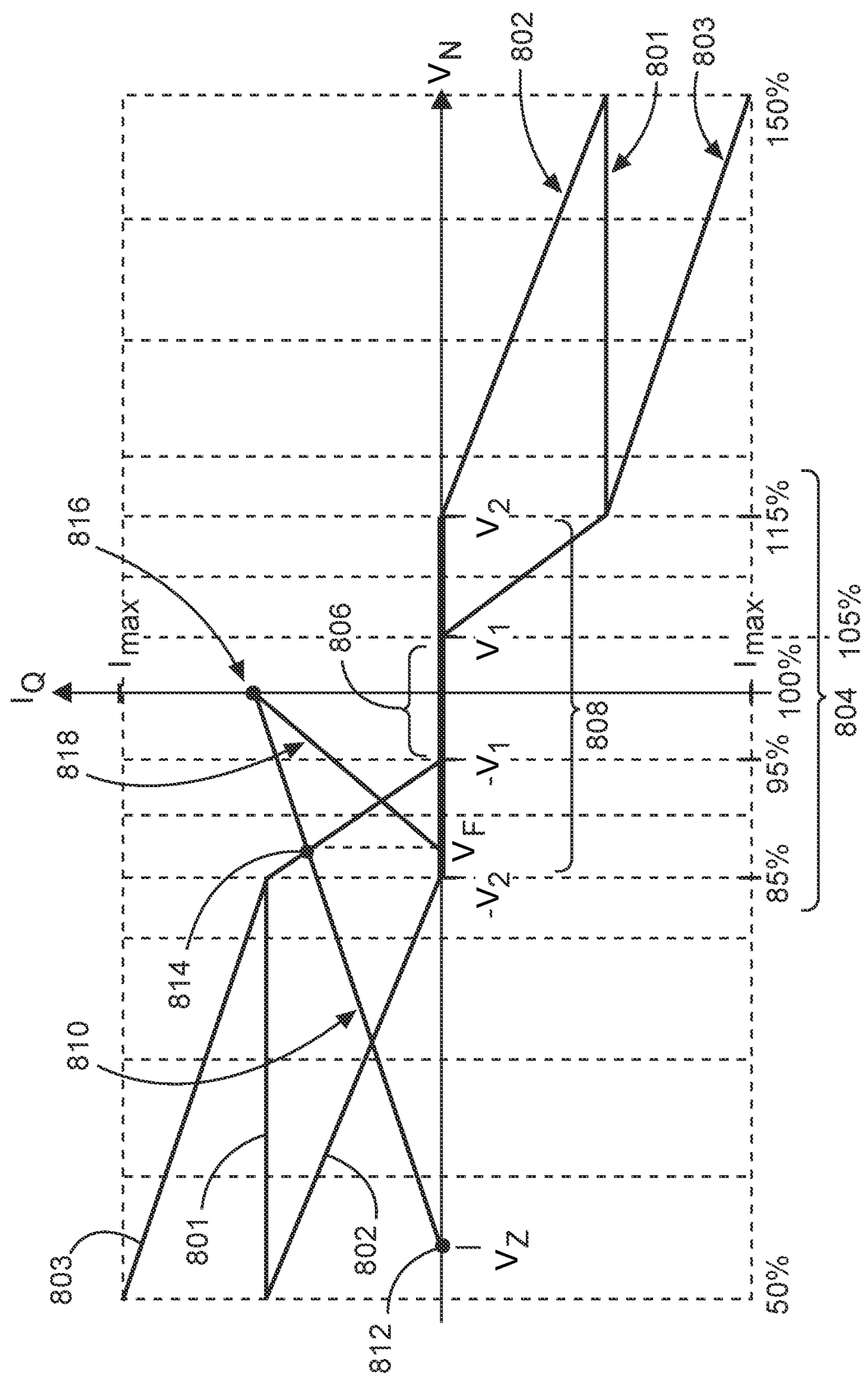
FIG. 8 shows an exemplary settable control behavior in a diagram.

FIG. 8 shows a diagram for a reactive power infeed which is dependent on the network voltage and which is also provided for ride through of a fault situation. For this a reactive current IQ is in each case represented as a function of the network voltage VN. In particular, a first characteristic curve 801 for a first wind power installation, a second characteristic curve 802 for a second wind power installation and a third characteristic curve 803 as resultant total characteristic curve are illustrated. It is proposed here in particular to predefine for a plurality of converter-controlled infeed apparatuses, i.e., here a first and a second wind power installation, different characteristic curves which complement one another to form an advantageous total characteristic curve. Different voltage bands spanning a voltage band range 804 are provided for this. The diagram shows for this at its origin for the network voltage the value 100%, i.e., rated voltage. The reactive power IQ has the value zero at the origin shown. Values are not entered for the reactive current. However, the diagram is linear in its representation, both for the voltage and for the current, and the reactive current attains its positive or negative maximum value in each case. In terms of absolute value, the diagram thus extends in each case as far as the maximum reactive current of the total characteristic curve.

A first voltage dead band range between 95% and 105% is provided for the first characteristic curve 801 and thus for the first wind power installation. The value of 95% thus forms a first lower reference voltage and the value of 105% a first upper reference voltage. These values thus define a first dead band 806. The first characteristic curve 801 is thus predefined such that no reactive current is fed in within the first dead band 806. Starting from the first upper reference voltage $V_1$, a negative reactive current is thus fed in in accordance with the first characteristic curve 801. Said reactive current increases in terms of absolute value proportionally as the voltage rises further. The increase in the negative reactive current is defined by way of a k-factor, which here is 10 (k=10). The reactive current therefore rises from zero to its maximum value (in terms of absolute value) in the case of a 10% voltage increase. The current thus rises from 0 to 1, while the voltage increases by 0.1. The reactive current of the first characteristic curve has thus reached its maximum in terms of absolute value in the case of a network voltage of 115% of the rated network voltage. This value of 115% here marks a second upper reference voltage.

The second characteristic curve 802 is designed such that it has a second dead band 808. The second dead band 808 thus extends from a second lower reference voltage $-V_2$ as far as a second upper reference voltage $V_2$. Consequently, the reactive current of the second characteristic curve 802 is zero in the second dead band 808 and, in terms of absolute value, starting from the second upper reference voltage $V_2$, rises in terms of absolute value as the network voltage increases further. A k-factor of 3.5 is provided here (k=3.5). The reactive current thus rises in terms of absolute value from zero to its maximum value in the case of a voltage increase from 115% to 150%, i.e., in the case of a voltage increase by 35%.

The common characteristic curve 803 results from the superposition. Said common characteristic curve likewise has the first dead band 806, but then rises in terms of absolute value starting from the first upper reference voltage $V_1$ as far as the second upper reference voltage $V_2$ with the k-factor k=10. Starting from the second upper reference voltage $V_2$, said common characteristic curve rises with the k-factor k=3.5 and then reaches its maximum value in terms of absolute value at 150%.

For voltage drops, all three characteristic curves are point-symmetric with respect to the origin of the diagram. That need not necessarily be the case, but that is the case in the diagram shown and that is also generally a preferred embodiment. The first characteristic curve 801 thus rises with a k-factor k=10 starting from the first lower reference voltage $-V_1$ as the network voltage falls further, namely as far as the second lower reference voltage. From that point on, as the network voltage falls further, the second characteristic curve 802 then rises with the k-factor k=3.5 as far as its maximum value at 50% network voltage. This results in the total characteristic curve 803 shown.

The diagram thus ranges from a voltage of 50% to 150% and thus far beyond a normal operating range of the network voltage. In this respect, the characteristic curves shown are provided for a fault situation and may also be designated in each case as an FRT characteristic curve. In this respect, the diagram in FIG. 8 thus shows a first FRT characteristic curve 801, a second FRT characteristic curve 802 and a total FRT characteristic curve 803. These characteristic curves thus show the behavior in the case of a fault in order as far as possible to ride through the latter.

A connection characteristic curve 810 is additionally illustrated. Said connection characteristic curve 810 shows a voltage-reactive power characteristic of the electrical supply network after a connection, in particular after a fault. At the connection voltage Vz, a connection operating point is present at which the voltage can have the value shown, i.e., here approximately 55%, and the reactive current is zero. Said connection operating point 812 is present for shorter than 30 ms, however. The reactive current is then increased as a function of the increase in the network voltage, namely in accordance with the connection characteristic curve 810 shown. The FRT operating point 814 is then reached at the FRT voltage $V_F$, which has approximately 87% in the example shown. Finally, the voltage control end point 816 is reached when the voltage has reached rated voltage.

The diagram additionally shows a possible voltage control of the first wind power installation by a voltage control characteristic curve 818. With this characteristic curve, if no fault ride through (FRT) is present, the network voltage can be driven back to the value of the FRT voltage $V_F$. The characteristic curves 801 and 802 each describe the voltage-dependent behavior predefined thereby of the respective wind power installations in the wind farm. This behavior is activated in the case of a fault or in the case of a disturbance, for the purpose of riding through the fault (FRT) or the disturbance. However, if the fault or the disturbance is overcome and the fault situation or disturbance situation is, at least partly, ended, this behavior and thus the corresponding characteristic curve can be deactivated. In place thereof there is then a reactive power control in which a reactive power is predefined by a farm controller, i.e., a central control facility of the wind farm.

The voltage control characteristic curve 818 shows for this a possible profile of the reactive power predefined by the farm controller or the corresponding reactive current, and the resulting voltage. The profile can then correspondingly lead to the voltage control end point 816.

The diagram is provided in particular for local network sections which can be characterized as a section with locally high converter pervasion connected to a weak network. These sections can ride through a fault by means of the described voltage control, i.e., the described reactive current infeed as a function of the network voltage. There need not necessarily be faults, but at least one disturbance is concerned. A disturbance situation in principle also comprises a fault situation.

In particular, it is proposed that the reactive power infeed which is dependent on the network voltage and which is also provided for riding through a fault situation, as explained in association with FIG. 8, is used as control behavior for riding through a network fault or a network disturbance. In particular, such a control behavior is selected or set depending on a vertical network load of the local network section or superordinate network section.

In particular, it is proposed to provide for a wind farm for riding through a fault or a disturbance a voltage-dependent reactive power control for each wind power installation of the wind farm, in particular with different characteristic curves for the wind power installations, wherein before and after the disturbance instead of the voltage-dependent reactive power control for each wind power installation, use is made of a reactive power control which is controlled centrally by a farm controller of the wind farm and in which the farm controller predefines a reactive power setpoint value for each wind power installation of the wind farm. Such a control concept which involves changing between the individual voltage regulation or voltage control at the individual wind power installations and a reactive power control controlled centrally by the farm controller is referred to as voltage combination control.

For the voltage-dependent reactive power control for each wind power installation, parameters are preferably set depending on the vertical network load, in particular a dead band and/or a gain factor, which can also be referred to as k-factor.

A and/or the described voltage-dependent reactive power control for each wind power installation for ride through of a fault or a disturbance by means of a characteristic curve, namely a voltage-reactive power characteristic curve, can also be referred to as FRT control, with FRT k-factors and an FRT dead band. FIG. 8 thus shows an FRT control.

The control behavior of the diagram in FIG. 8 is provided particularly if a network separation or a topological switchover in the electrical supply network can be assumed as the most probable scenario. A parameterization with reactive power prioritization is proposed here in the case of the voltage-dependent reactive power infeed. A limitation of the reactive current to 90% of the converter apparent current is proposed at the same time. In this respect, the reactive power prioritization would be lessened somewhat, namely to said 90%. Moreover, it is proposed to choose the dead bands differently for the installations. For half of the installations the dead bands should ideally be smaller than for the other installations and the k-factors should be large in comparison with the other installations.

It has thus been recognized that local network sections can be characterized differently, which depends not only on the local network section as such but also on how or whether it is connected to an electrical supply network. In most cases, it is connected to an electrical supply network and the way in which in particular a neighboring superordinate network section is embodied can then additionally be of importance for the characterization. The control behavior can be chosen depending on that. In addition, further characteristics or properties can be taken into account. As a result, in particular an increase in the proportion of renewable generators and thus converter-controlled generators in electrical supply networks can be taken into account. In this respect, account is taken in particular of such local network sections which have a high converter pervasion, and a targeted control or regulation therefor is proposed. This also includes concepts for the electrical supply network overall.

It has been recognized that traditional FRT strategies have a number of possible parameterization possibilities which are appropriate for an operating point of the network. In practice, however, the operating point of the network changes and the requirements and the parameterization are not ideal.

It is proposed to adapt the following parameters depending on the network state:
- A reactive-power-prioritized driving mode or active-power-prioritized driving mode. This mode can be asymmetrical, positive or negative.
- A dynamic reactive current limitation and/or a dynamic active power limitation. This limitation, too, can be asymmetrical, positive or negative.
- The size of an FRT dead band.
- FRT k-factors for overvoltage and/or undervoltage.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for feeding electrical power into an electrical supply network using a converter-controlled infeed apparatus that feeds the electrical power into the electrical supply network using at least one converter, comprising:

feeding, by the converter-controlled infeed apparatus, the electrical power into a local network section of the electrical supply network at a network connection point, wherein:
the electrical supply network includes:
a plurality of infeed apparatuses including the converter-controlled infeed apparatus and one or more other infeed apparatuses, for feeding infeed power including the electrical power of the converter-controlled infeed apparatus, and
a plurality of consumers for consuming a consumption power, and
the local network section has a converter pervasion of at least 50%, wherein the converter pervasion is a ratio of a rated power of converter-controlled infeed apparatuses of the plurality of infeed apparatuses to a total rated power of the plurality of infeed apparatuses; and controlling, by a controller, the feeding of the electrical power of the converter-controlled infeed apparatus depending on a network state of the electrical supply network, wherein:
the controller has a control behavior that is selected or set depending on a network characteristic of the local network section, and the network characteristic is dependent on:
at least one property of the local network section and at least one property of another network section of the electrical supply network, the other network section being coupled to the local network section, or
the at least one property of the local network section and a determination that another network section is not coupled to the electrical supply network,
wherein the network characteristic of the local network section is an island network in response to:
the local network section corresponding to the electrical supply network,
the electrical supply network forming a self-contained network, and
a sum of consumption powers of the plurality of consumers coupled to the electrical supply network does not exceed 5 gigawatt (GW),
wherein the network characteristic of the local network section is a section with high converter pervasion coupled to a strong network in response to:
the local network section being coupled to a superordinate network section relative to the local network section,
the sum of the consumption powers of the plurality of consumers coupled to the electrical supply network exceeding 5 GW,
the superordinate network section being part of the electrical supply network, and
the superordinate network section has a high centrifugal mass index of at least 50%, and/or a power exchange capacity with respect to the local network section, wherein the centrifugal mass index is a ratio between electrical power able to be fed into the superordinate network section by directly coupled synchronous generators to a total power able to be fed into the superordinate network section,
wherein the network characteristic of the local network section is a section with locally high converter pervasion coupled to a normal network in response to:
converter-controlled infeed apparatuses of the local network section being coupled to the local network section with an average short circuit ratio having a value of a maximum of 4,
the local network section being coupled to the superordinate network section,
the sum of the consumption powers of the plurality of consumers coupled to the electrical supply network exceeding 5 GW,
the superordinate network section being part of the electrical supply network, and
the superordinate network section having a centrifugal mass index between 20% and 100%,
wherein the network characteristic of the local network section is a section with high converter pervasion coupled to a network with high converter pervasion in response to:
the local network section being coupled to the superordinate network section,
the sum of the consumption powers of the plurality of consumers coupled to the electrical supply network exceeding 5 GW,
the superordinate network section being part of the electrical supply network, and
the superordinate network section having a low centrifugal mass index and
wherein the network characteristic of the local network section is a section with indefinite behaviors in response to the network characteristic not being the island network, the section with the high converter pervasion coupled to the strong network, the section with the locally high converter pervasion coupled to the normal network or the section with the high converter pervasion coupled to the network with the high converter pervasion.

2. The method as claimed in claim 1, wherein:
the converter-controlled infeed apparatus is a wind power installation, a wind farm comprising a plurality of wind power installations or a photovoltaic installation, and
the one or more other infeed apparatuses are a conventional generator, a gas turbine or a diesel generator.

3. The method as claimed in claim 1, wherein:
the high centrifugal mass index is defined by a value that is above a predefinable centrifugal mass reference index,
the power exchange capacity is a ratio between maximum power exchangeable between the superordinate network section and the local network section in relation to power able to be fed in by the plurality of infeed apparatuses of the local network section and is at least 50%, and
the low centrifugal mass index is below the predefinable centrifugal mass reference index or below a second centrifugal mass reference value.

4. The method as claimed in claim 1, comprising:
selecting or setting the control behavior depending on the network state of the electrical supply network; and/or
selecting or setting the control behavior depending on a converter infeed proportion of the local network section, wherein the converter infeed proportion is a ratio of power fed in by converters of the local network section to a total power fed in by the plurality of infeed apparatuses of the local network section.

5. The method as claimed in claim 1, wherein the control behavior is selected or set depending on a vertical network load of the local network section or the superordinate network section of the local network section that has a higher voltage than the local network section, wherein the vertical network load is a sum of all power transmissions from a transmission network coupled to the network section via directly coupled transformers.

6. The method as claimed in claim 1, wherein:
the control behavior is set depending on a voltage softness of the local network section or the superordinate network section of the local network section that has a higher voltage than the local network section, and
the voltage softness is a reciprocal of a quotient between:
a value of a relative reactive power change as change in total reactive power fed into the local network section, relative to a maximum reactive power configured to fed into the local network section, and
a value of a relative voltage change resulting from the change in the fed-in reactive power at a reference point of the local network section.

7. The method as claimed in claim 1, wherein the control behavior is set depending on a frequency softness of the local network section or the superordinate network section of the local network section that has a higher voltage than the local network section, wherein the frequency softness is a reciprocal of a quotient between a value of a relative change in a total active power fed into the local network section and a rate of frequency change resulting from the change in the total active power in the network section.

8. The method as claimed in claim 1, wherein:
the control behavior is set depending on a renewable capacity factor of the local network section or the superordinate network section, wherein the renewable capacity factor is a quotient between:
a total power fed in by energy sources of fluctuating power that feed into the local network section or the superordinate network section, respectively, and
a maximum power that is feedable by the energy sources of fluctuating power.

9. The method as claimed in claim 8, wherein the total power fed in by the energy sources of fluctuating power is active power.

10. The method as claimed in claim 8, wherein the energy sources of fluctuating power are wind power installations or photovoltaic installations.

11. The method as claimed in claim 8, wherein the maximum power is a sum of rated powers of the energy sources of fluctuating power.

12. The method as claimed in claim 1, wherein the control behavior has at least one control property, and the at least one control property is selected by:
selecting between a reactive-power-prioritized driving mode and an active-power-prioritized driving mode, wherein:
in the reactive-power-prioritized driving mode, active power fed in is limited for complying with an apparent power limit, and
in the active-power-prioritized driving mode, reactive power fed in is limited for complying with the apparent power limit,
selecting between a proportion of a reactive power limitation and a proportion of an active power limitation in response to the apparent power limit being reached,
setting a voltage dead band, wherein the voltage dead band specifies a voltage range surrounding a rated network voltage, and wherein an additional reactive power for voltage backup is not fed in the voltage dead band, and
setting gain factors for the voltage backup, wherein the gain factors specify a ratio of a reactive power change to be performed to a detected voltage change.

13. A wind energy system comprising:
at least one wind power installation,
wherein the wind energy system is a converter-controlled infeed apparatus and feeds electrical power into an electrical supply network using at least one converter,
wherein the converter-controlled infeed apparatus feeds into a local network section of the electrical supply network at a network connection point, and the electrical supply network includes:
a plurality of infeed apparatuses including the converter-controlled infeed apparatus and other infeed apparatuses, for feeding infeed power including the electrical power of the converter-controlled infeed apparatus, and
a plurality of consumers for consuming a consumption power,
wherein the local network section has a converter pervasion of at least 50%, wherein the converter pervasion is a ratio of a rated power of converter-controlled infeed apparatuses of the plurality of infeed apparatuses to a total rated power of the plurality of infeed apparatuses,
wherein the converter-controlled infeed apparatus includes a controller configured to control the electrical power of the converter-controlled infeed apparatus depending on a network state of the electrical supply network,
wherein the controller has a controller behavior that is selected or set depending on a network characteristic of the local network section, and the network characteristic is dependent on:
at least one property of the local network section and at least one property of another network section, of the electrical supply network, coupled to the local network section, or
the at least one property of the local network section and a determination that another network section is not coupled to the electrical supply network,
wherein the network characteristic of the local network section is an island network in response to:
the local network section corresponding to the electrical supply network,
the electrical supply network forming a self-contained network, and
a sum of consumption powers of the plurality of consumers coupled to the electrical supply network does not exceed 5 gigawatt (GW),
wherein the network characteristic of the local network section is a section with high converter pervasion coupled to a strong network in response to:
the local network section being coupled to a superordinate network section relative to the local network section, the sum of the consumption powers of the plurality of consumers coupled to the electrical supply network exceeding 5 GW, the superordinate network section being part of the electrical supply network, and the superordinate network section has a high centrifugal mass index of at least 50%, and/or a power exchange capacity with respect to the local network section, wherein the centrifugal mass index is a ratio between electrical power able to be fed into the superordinate network section by directly coupled synchronous generators to a total power able to be fed into the superordinate network section, wherein the network characteristic of the local network section is a section with locally high converter pervasion coupled to a normal network in response to:

converter-controlled infeed apparatuses of the local network section being coupled to the local network section with an average short circuit ratio having a value of a maximum of 4, the local network section being coupled to the superordinate network section, the sum of the consumption powers of the plurality of consumers coupled to the electrical supply network exceeding 5 GW, the superordinate network section being part of the electrical supply network, and the superordinate network section having a centrifugal mass index between 20% and 100%, wherein the network characteristic of the local network section is a section with high converter pervasion coupled to a network with high converter pervasion in response to:

the local network section being coupled to the superordinate network section, the sum of the consumption powers of the plurality of consumers coupled to the electrical supply network exceeding 5 GW, the superordinate network section being part of the electrical supply network, and the superordinate network section having a low centrifugal mass index, and wherein the network characteristic of the local network section is a section with indefinite behaviors in response to the network characteristic not being the island network, the section with the high converter pervasion coupled to the strong network, the section with the locally high converter pervasion coupled to the normal network or the section with the high converter pervasion coupled to the network with the high converter pervasion.

14. A method for feeding electrical power into an electrical supply network using a converter-controlled infeed apparatus that feeds the electrical power into the electrical supply network using at least one converter, comprising:

feeding, by the converter-controlled infeed apparatus, the electrical power into a local network section of the electrical supply network at a network connection point, wherein:

the electrical supply network includes:

a plurality of infeed apparatuses including the converter-controlled infeed apparatus and one or more other infeed apparatuses, for feeding infeed power including the electrical power of the converter-controlled infeed apparatus, and a plurality of consumers for consuming a consumption power, and the local network section has a converter pervasion of at least 50%, wherein the converter pervasion is a ratio of a rated power of converter-controlled infeed apparatuses of the plurality of infeed apparatuses to a total rated power of the plurality of infeed apparatuses; and controlling, by a controller, the feeding of the electrical power of the converter-controlled infeed apparatus depending on a network state of the electrical supply network, wherein:

the controller has a control behavior that is selected or set depending on a network characteristic of the local network section, and the network characteristic is dependent on:

at least one property of the local network section and at least one property of another network section of the electrical supply network, the other network section being coupled to the local network section, or the at least one property of the local network section and a determination that another network section is not coupled to the electrical supply network, wherein the control behavior is set depending on a voltage softness of the local network section or a superordinate network section of the local network section that has a higher voltage than the local network section, and wherein the voltage softness is a reciprocal of a quotient between:

a value of a relative reactive power change as change in total reactive power fed into the local network section, relative to a maximum reactive power configured to fed into the local network section, and a value of a relative voltage change resulting from the change in the fed-in reactive power at a reference point of the local network section.

* * * * *